US010948299B1

United States Patent
Zhang et al.

(10) Patent No.: US 10,948,299 B1
(45) Date of Patent: Mar. 16, 2021

(54) RELATIVE INERTIAL MEASUREMENT SYSTEM WITH VISUAL CORRECTION

(71) Applicant: Apple Inc., Cupertino, CA (US)

(72) Inventors: Arthur Y. Zhang, San Jose, CA (US); Sonca Teng, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 16/145,086

(22) Filed: Sep. 27, 2018

Related U.S. Application Data

(60) Provisional application No. 62/564,959, filed on Sep. 28, 2017.

(51) Int. Cl.
*G01C 21/16* (2006.01)
*G06T 7/246* (2017.01)

(52) U.S. Cl.
CPC ............ *G01C 21/165* (2013.01); *G06T 7/248* (2017.01); *G06T 2207/30252* (2013.01)

(58) Field of Classification Search
CPC ................... G01C 21/165; G06T 7/248; G06T 2207/30252
See application file for complete search history.

(56) References Cited

U.S. PATENT DOCUMENTS

| 2004/0149036 A1* | 8/2004 | Foxlin .................... A61B 5/1113 73/511 |
| 2011/0125404 A1* | 5/2011 | Czompo ................. G01S 19/49 701/472 |
| 2012/0078510 A1* | 3/2012 | Ma ........................ G05D 1/027 701/426 |
| 2012/0176492 A1* | 7/2012 | Garin .................... G01C 21/165 348/116 |
| 2015/0317834 A1* | 11/2015 | Poulos .................... G06F 3/011 345/619 |
| 2018/0081426 A1* | 3/2018 | Rothkopf ........... G02B 27/0179 |
| 2018/0266828 A1* | 9/2018 | Best ...................... G05D 1/0223 |

* cited by examiner

*Primary Examiner* — Gregory J Toatley, Jr.
*Assistant Examiner* — Lyudmila Zaykova-Feldman
(74) *Attorney, Agent, or Firm* — Kowert, Hood, Munyon, Rankin & Goetzel, P.C.; Robert Kowert

(57) ABSTRACT

Methods and systems for relative inertial measurement may include a user device comprising an inertial measurement device and/or a camera. A second inertial measurement device may be configured to move with a reference frame. One or more processors may receive inertial measurements from the first and second inertial measurement devices and determine movement of the user device relative to the reference frame by comparing the received inertial measurements. Additionally reference objects in a view of a camera may be used to calibrate the determined motion of the user device within the reference frame.

20 Claims, 18 Drawing Sheets

RELATIVE INERTIAL MEASUREMENT SYSTEM WITH VISUAL CORRECTION

PRIORITY DATA

This application claims benefit of priority to U.S. Provisional Application Ser. No. 62/564,959, entitled "Relative Inertial Measurement System with Visual Correction," filed Sep. 28, 2017, and which is incorporated herein by reference in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, augmented reality (AR) combines computer generated information with real world images to augment, or add content to, a user's view of the world. The simulated environments of virtual reality and/or the enhanced content of augmented reality may thus be utilized to provide an interactive user experience for multiple applications, such as interacting with virtual training environments, gaming, remotely controlling drones or other mechanical systems, viewing digital media content, interacting with the internet, or the like. In addition, VR systems and/or AR systems may utilize inertial measurements from an inertial measurement unit (IMU) included in a VR or an AR device to determine how images are to be displayed. Also, an IMU may be included in various other types of devices such as controllers used with a VR or an AR device or controllers used for various other purposes.

Conventional virtual reality and augmented reality systems may not be able to separate motion of a user or a body part of a user from motion of a reference frame in which the user is travelling, such as a vehicle in which the user is travelling. For example, a user wearing a conventional VR or AR device may be seated in a vehicle and the vehicle may accelerate from a stopped position to a high speed while the user wearing the VR or AR device sits in the vehicle without moving within the vehicle (e.g. no relative motion of the user relative to the reference frame of the vehicle). Because the conventional VR or AR device cannot separate the motion of the user's body from the motion of the vehicle, the conventional VR or AR device may attribute the motion of the vehicle to the user. Thus images displayed to the user on the VR or the AR device may appear to the user as if the user is running through a scene at the same speed and in the same direction the vehicle is travelling. A similar phenomenon occurs in regard to angular motion. For example, a user wearing a conventional VR or AR device may be riding in a vehicle that turns, however the user may not actually turn the user's head when the vehicle turns. A conventional AR or VR device may not be able to separate the motion of the user's head (e.g. not turning) from the motion of the vehicle (e.g. turning). Therefore, the turning motion of the vehicle may be attributed to the user and images displayed to the user on the VR or AR device may appear to be turning or spinning despite the user not turning the user's head. Such discrepancies between a user's relative motion within a vehicle and motion observed by the user via a scene displayed to the user may lead to nausea and sickness of the user. For example, nausea may be caused by oculovestibular mismatch. Likewise, in the case of other types of devices that include IMUs, such as controllers, motion of a vehicle being attributed to the controller may lead to erratic control and unintended consequences.

Also, some VR or AR devices may include cameras or other sensors that are used to correct for drift resulting from small errors that accumulate over time when determining a location of the AR or VR device from motion measurements from an IMU. For example, a visual inertial odometry (VIO) algorithm may correct a position for an AR or VR device determined based on IMU measurements by comparing a change in distance from the AR or VR device to a reference point in a view of a camera of the AR or VR device over a period of time to a change in distance according to positions determined based on IMU measurements for the AR or VR device over the period of time. However, such VIO algorithms may not function properly when a VR or AR device is used in a moving reference frame. For example, some objects in a view of camera of the AR or VR device may move with the reference frame while other objects may not move with the reference frame. Also, some of the objects that do not move with the reference frame may be stationary or mobile objects, for example other vehicles on the road. When a VIO algorithm inadvertently selects an object that does not move with the reference frame as a reference point, motion of the reference frame or the object may be attributed to drift error and the VIO algorithm may over compensate for drift. This may lead to erratic behavior of the AR or VR device.

SUMMARY

Methods and systems for relative inertial measurement may include a system comprising a user device. For example, a user device may be a headset that couples with a user's head, a band that couples with a user's wrist, finger, arm, leg, foot, etc., or another type of device that couples with a user. Also, a system may include other types of user devices, such as phones, tablets, laptops, etc. The user device(s) may include an inertial measurement device mechanically coupled to the user device and configured to measure movement of the user device as the user device moves within a reference frame. For example, an inertial measurement device may include accelerometers, gyroscopes, and/or magnetometers configured to measure inertial motion in multiple directions. In addition to the inertial measurement device mechanically coupled to the user device, the system may also include an additional inertial measurement device configured to move with a reference frame, such as a vehicle, in which the user device is riding. The system also includes a memory storing program instructions that when executed on one or more processors, causes the one or more processors to implement a reference frame motion module, configured to determine, at a first frequency, motion information for the reference frame based, at least in part, on measurements from the additional inertial measurement device. The reference frame motion module is also configured to adjust, at another frequency, the motion information for the reference frame based, at least in part, on data captured by the camera. In addition, the reference frame motion module is configured to provide the motion information for the reference frame to the user device, wherein the user device is configured to determine motion of the user device relative to the reference frame based, at least in part, on the provided motion information for the reference frame. In some embodiments the user device may further include a display and the relative motion of the user device may be used to determine images to be displayed on the display. Also, in some embodiments, that include a controller, control actions may be determined based, at least in part, on the relative movement of the user device.

In some embodiments, a reference frame motion measurement system includes an inertial measurement device that moves with a reference frame and a camera that moves with the reference frame. The reference frame motion measurement system also includes a memory storing program instructions that when executed on one or more processors, causes the one or more processors to implement a motion module configured to determine, at a first frequency, motion information for the reference frame based, at least in part, on measurements from the inertial measurement device, adjust, at another frequency, the motion information for the reference frame based, at least in part, on data captured by the camera, and provide the motion information for the reference frame to a user device, wherein the user device determines motion of the user device relative to the reference frame based, at least in part, on the provided motion information.

In some embodiments, a method includes measuring motion of a reference frame at a first frequency based, at least in part, on measurements from an inertial measurement device, adjusting the motion information for the reference frame at another frequency based, at least in part, on data captured by a camera coupled to a structure that moves with the reference frame, and providing the motion information for the reference frame to a user device, wherein the user device determines motion of the user device relative to the reference frame based, at least in part, on the provided motion information from the reference frame motion measurement device.

Figure 1:
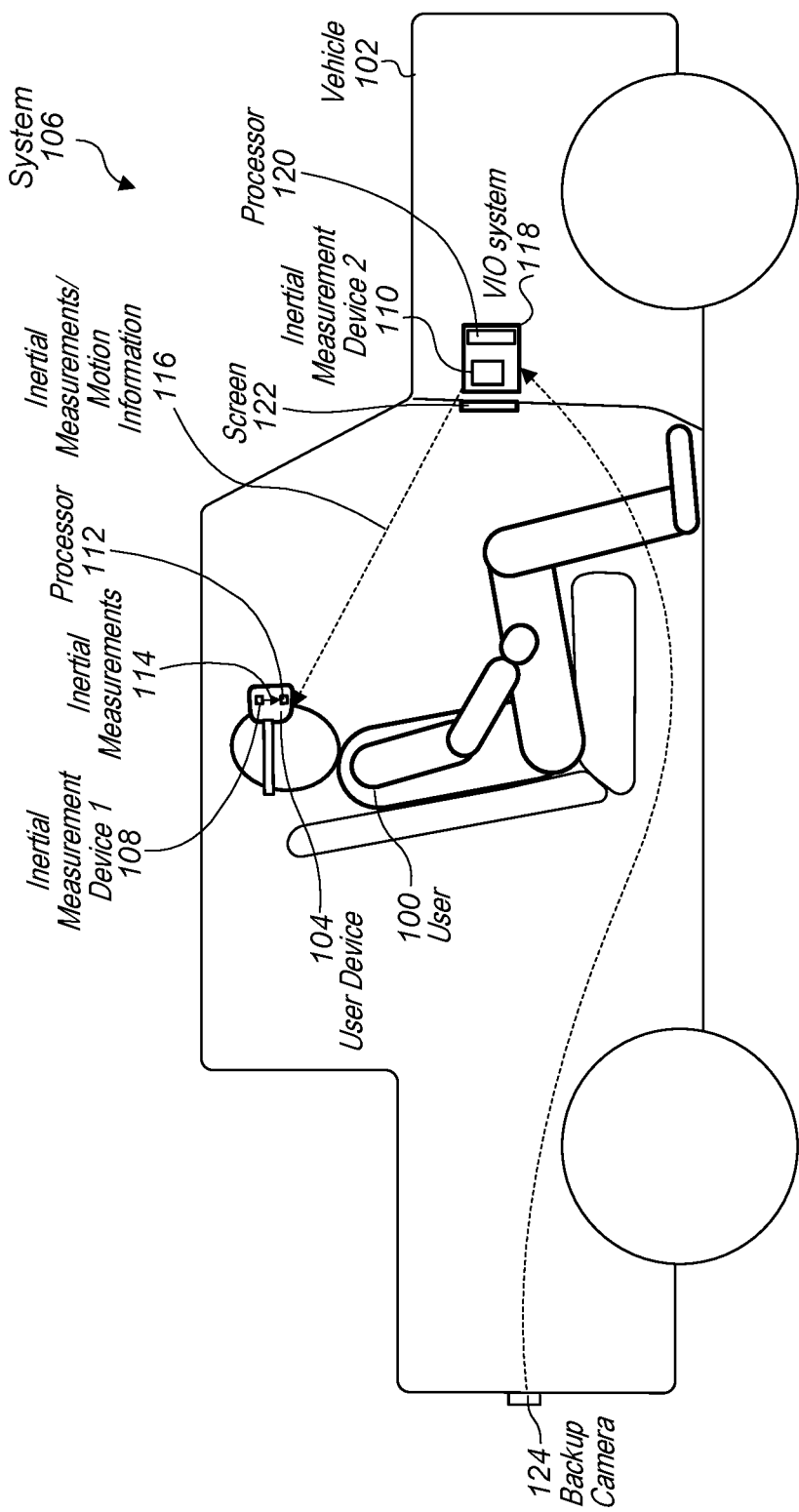
FIG. 1 illustrates a user riding in a moving reference frame and a system including multiple inertial measurement devices for determining relative motion of the user relative to the reference frame, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of a system, user device, and method are described that implement relative inertial measurement technology to determine relative motion of a user device relative to a non-fixed reference frame, such as a vehicle in which the user device is travelling. In some embodiments, relative inertial measurement technology may be used to determine images to be displayed to a user via a user device comprising a head mounted display based on relative movements of the user's head while the user is wearing the head mounted display and while the user is travelling in a non-fixed reference frame, such as a vehicle. In some embodiments, relative inertial measurement technology may be used with a controller coupled to a user's body to determine motion of the user's body relative to motion of a non-fixed reference frame in which the user is travelling, such as a moving vehicle.

In some embodiments, a relative inertial measurement system includes at least two inertial measurement devices. A first inertial measurement device may be mechanically coupled with a user device. For example, a user device may be a head-mounted display of a virtual reality system or of an augmented reality system. The first inertial measurement device may be mechanically coupled to a part of the head-mounted display. Thus the first inertial measurement device may move with the part of the user's body to which the user device is coupled and may measure movement of the user device due to movement of the part of the user's body to which the user device is coupled. For example, a first inertial measurement device included in a head-mounted display may measure movement of a user's head.

In the case of a user device that is moving in a non-fixed reference frame, such as a vehicle, a first inertial measurement device included in the user device may measure both the movement of the non-fixed reference frame (e.g. the vehicle) and the movement of the user device within the non-fixed reference frame. For example, if a user is wearing a head-mounted display that includes the first inertial measurement device and the user turns the user's head to the right 20 degrees at the same time a vehicle in which the user is riding makes a right hand turn of 90 degrees, the first inertial measurement device may measure inertial movement of 110 degrees (e.g. 90 degrees due to the vehicle turning and 20 degrees due to the user turning the user device coupled to the user's head within the vehicle).

A relative inertial measurement system may also include a second inertial measurement device or a user device may be configured to receive inertial measurements from a second inertial measurement device. The second inertial measurement device may be configured to move with the non-fixed reference frame (e.g. the vehicle) but to not move with a body part of a user to which the user device that includes the first inertial measurement device is coupled. Thus, the second inertial measurement device may measure movement of the non-fixed reference frame (e.g. the vehicle) without including motion of the user device within the non-fixed reference frame in the measurement. For example, the second inertial measurement device may be a set of sensors built into a vehicle, may be a device the user attaches to the vehicle, or may be included in a multi-purpose portable device the user is carrying, such as a phone, tablet, computer, or the like that moves with the vehicle but not with the user's body part to which the first inertial measurement device is coupled.

A relative inertial measurement system may also include one or more processors that receive inertial measurements from the first and second inertial measurement devices or the one or more processors may be included in the user device. The one or more processors may determine a relative motion of the user device relative to motion of the non-fixed reference frame (e.g the vehicle) based on differences between the inertial measurements received from the first inertial measurement device and the inertial measurements received from the second inertial measurement device. For example, the one or more processors may determine that the user turned his head 20 degrees by subtracting an inertial measurement from the second inertial measurement device indicating the vehicle turned 90 degrees from an inertial measurement from the first inertial measurement device indicating that the user's head turned on overall amount of 110 degrees. In a similar manner, various other relative inertial motions may be determined by the one or more processors based on received inertial measurements from the first and second inertial measurement devices, such as relative acceleration, relative velocity, position, relative position within the non-fixed reference frame (e.g. the vehicle), three-dimensional orientation within the non-fixed reference frame (e.g. the vehicle), and orientation in three dimensional space with regard to a reference frame outside of the vehicle such as the earth.

FIG. 1 illustrates a user riding in a vehicle and a system including multiple inertial measurement devices for determining relative motion of the user relative to the vehicle, according to some embodiments. User 100 is riding in vehicle 102. Vehicle 102 is illustrated in FIG. 1 as an automobile, however in some embodiments a user, such as user 100, may be riding in various types of vehicles, such as trains, planes, subways, boats, elevators, or other types of vehicles. In some embodiments, a user, such as user 100, may be driving the vehicle, may be a passenger in the vehicle, or may provide input to a system that drives the vehicle. A user device, such as user device 104, may be coupled to a user or a part of a user's body. For example, user device 104 includes a head-mounted display coupled to the head of user 100. A user device, such as user device 104, may be part of an inertial measurement system, such as system 106, that determines relative motion of a user device coupled to a part of the user's body relative to a reference frame in which the user is riding. For example, user device 104 may be a head-mounted display and inertial measurement system 106 that includes user device 104 may be configured to determine relative motion of user 100's head relative to an inertial reference of vehicle 102 in which user 100 is riding.

In order to determine relative motion of a user device coupled to a part of a user's body, an inertial measurement system, such as system 106, may include one or more processors that receive inertial measurements from an inertial measurement device, such as inertial measurement device 108, and that receive inertial measurements from an additional inertial measurement device, such as inertial measurement device 110. One of the inertial measurement devices may be mechanically coupled to a user device that couples with a part of the body of the user. For example, inertial measurement device 108 is mechanically coupled to user device 104 that is a head-mounted display coupled to user 100's head and that is configured to move with user 100's head as user 100 moves their head.

In addition, an inertial measurement system, such as system 106, may include an additional inertial measurement device, such as inertial measurement device 110, coupled to a non-fixed reference frame, such as vehicle 102. The additional measurement device may move with the non-fixed reference frame (e.g. vehicle 102) and may measure the inertial motion of the non-fixed reference frame (e.g. vehicle 102) without including in the device's measurements motion of the part of the user's body to which the user device that includes the first inertial measurement device is attached. For example, the inertial measurements of inertial measurement device 110 may measure motion of vehicle 102 without including motion of user 100's head in the device's measurements.

In some embodiments, an additional inertial measurement device, such as inertial measurement device 110 may be included in a visual inertial odometry (VIO) system, such as VIO system 118. In some embodiments, a VIO system may include a memory and one or more processors, such as processors 120. The processors may execute a VIO algorithm stored in the memory, or in some embodiments, a VIO algorithm may be implemented in hardware on the processors. The VIO system may determine motion, for example of the non-fixed reference frame (e.g. the vehicle), based on inertial measurements from an inertial measurement device, such as inertial measurement device 110. In addition, the VIO system may, at a lower frequency than a measurement frequency, adjust a determined motion of the non-fixed reference frame (e.g. the vehicle) based on motion determined from images captured by a camera, such as back-up camera 118. For example, back-up camera 118 may capture multiple images at different points in time wherein at least some objects are included in multiple ones of the multiple images. In some embodiments, a VIO system may identify one or more objects in multiple images captured by the camera at different points and time and may determine a velocity or acceleration of the non-fixed reference frame (e.g. the vehicle) based on a distance the object moves in the captured images and an amount of time between when the images were captured. In some embodiments, the VIO system may then adjust motion information, such as position, velocity, or acceleration, determined based on an inertial measurement device of the VIO system based on calibration information derived from a difference in motion determined from the inertial measurement devices and motion determined from the captured images. For example, VIO system 118 may determine a slight error in motion information determined based on inertial measurement device 110 by comparing a velocity or acceleration measured by inertial measurement device 110 to a velocity or acceleration determined based on images captured from backup camera 124. The VIO system may then recalibrate how motion information is determined based on inertial measurements from an inertial measurement device, such as inertial measurement device 110, to take into account the calibration information.

In some embodiments, a VIO system, such as VIO system 118 may be included in a navigation system of a vehicle. For example, a VIO system may be part of a navigation system that displays navigation information on screen 122. In some embodiments, a VIO system, such as VIO system 118, may be a stand-alone system. Also, in some embodiments, a VIO system may be distributed amongst multiple devices. For example, in some embodiments, a VIO algorithm for a non-fixed reference frame (e.g. a vehicle) may execute on a processor included in a user device, such as processor 112, and may receive inertial measurements from an inertial measurement device, such as inertial measurement device 110, and may receive captured images from a camera, such as back-up camera 124. In some embodiments, a camera coupled to a structure of a non-fixed reference frame, such as vehicle 102, may be position in various other locations. For example, a camera may be positioned in a front bumper, on a side of vehicle, under a vehicle point down at the road, etc.

An inertial measurement system, such as system 106, may also include one or more processors, such as processors 112, that are configured to receive inertial measurements from multiple inertial measurement devices, or a VIO system. For example, processors 112 receive inertial measurements 114 from inertial measurement device 108 and/or VIO system 118 and receive inertial measurements/motion information 116 from inertial measurement device 110. In some embodiments, processors, such as processors 112, may be included in a user device, such as user device 104, or may be included in a system that communicates with an inertial measurement device, such as inertial measurement device 108, included in a user device, such as user device 104. For example, in some embodiments, processors 112 may be separate from user device 104 and may be a built-in component of vehicle 102 or may be included in user device 104.

In order to determine relative motion of a user device coupled to a body part of a user, the one or more processors of an inertial measurement system, such as processors 112 of system 106, may determine differences between inertial measurements measured by an inertial measurement device that moves with a part of a user's body that is riding in a non-fixed reference frame, such as a vehicle, and inertial measurements or motion measured by an additional inertial measurement device or determined by a VIO system that is coupled to the non-fixed reference frame, e.g. the vehicle in which the user is riding, and that does not move with the part of the body of the user to which the user device is coupled.

In some embodiments, the additional inertial measurement device that does not move with the part of the body of the user to which the user device is coupled may be a built-in component of the vehicle or may be a separate component separate from the user device and may be configured to be coupled to the vehicle. Further, in some embodiments, the additional inertial measurement device that does not move with the part of the body of the user to which the user device is coupled may be a portable multipurpose computing device such as a phone, tablet, laptop or other portable computing device. For example, in some embodiments, inertial measurement device 110 may be included in a portable multi-purpose computing device, such as a phone, tablet, laptop, etc. In some embodiments, VIO system 118 may be included in a portable multi-purpose computing device, such as a mobile phone, stowed in a pocket of user 100. In such embodiments, VIO system 118 may move with vehicle 102 without moving when user 100's head moves. Thus, inertial measurement device 110 may provide inertial measurements that correspond to movement of a non-fixed inertial reference frame represented by vehicle 102 without including measurements of the user's motion within the non-fixed inertial reference frame (e.g. the movement of user 100's head). The one or more processors may be configured to subtract relative motion of a non-fixed inertial reference frame from an overall inertial measurement that includes both motion of vehicle 102 and motion of user 100's head within vehicle 102 to determine relative motion of a user device coupled to user 100's head relative to a non-fixed reference frame (e.g. relative to vehicle 102). In some embodiments, inertial measurements may include vector components measurements (e.g. X, Y, and Z components). Also, in some embodiments, inertial measurements may include angular motion measurements around multiple axis (e.g. angular motion about X, Y, and Z axis). The one or more processors may subtract inertial measurements that include multi-component measurements and multi-angular motion measurements to determine relative inertial motion. In some embodiments, various other coordinate systems may be used, such as polar coordinates or other suitable coordinate systems.

In some embodiments, a user device may also include a VIO system as described above, wherein the VIO system is used to determine position or motion of the user device within the non-fixed reference frame. In such embodiments, a user device may include a camera coupled to the user device, wherein objects within the non-fixed reference frame, such as a rear-view mirror, seatbelt, headrest, etc., that are within a view of the camera of the user device are used as reference points. A VIO system of a user device may compare a distance to an object within the non-fixed reference frame at different points in time to correct a determined position of the user device in the non-fixed reference framed determined for the points in time. For example, a position of the user device determined based on relative inertial motion measurements (e.g. measured inertial motion minus non-fixed reference frame inertial motion) may include slight errors, that when accumulated over time, may add up to noticeable errors in position that give the user the impression that the user is drifting away even though the user has not actually moved in the non-fixed reference frame (e.g. the vehicle). Also, a VIO system of a user device may determine velocity and/or acceleration calibration information as described above for VIO system 118.

Figure 2:
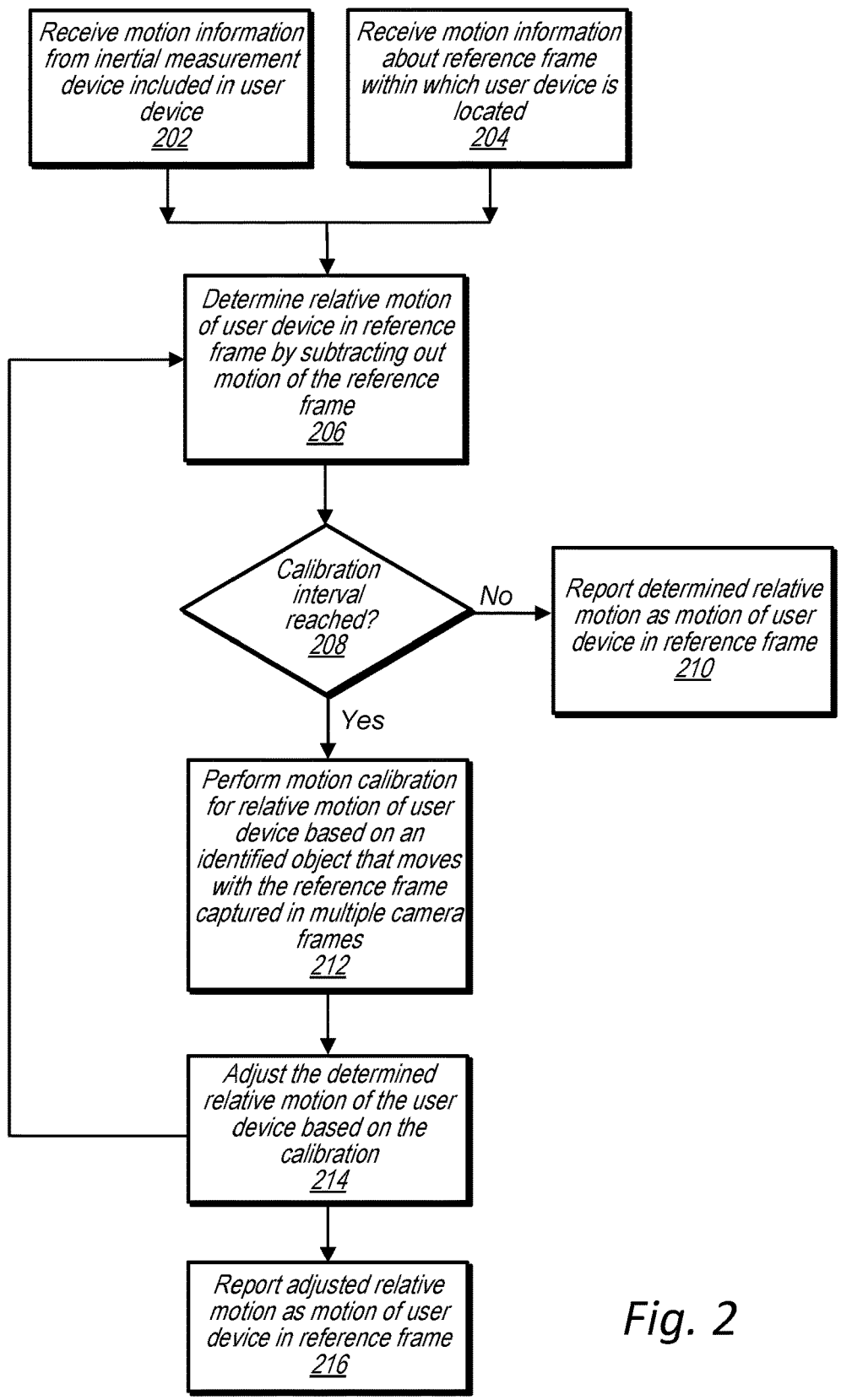
FIG. 2 is a flow diagram illustrating determining motion of a user device relative to a reference frame, according to some embodiments.

FIG. 2 is a flow diagram illustrating determining motion of a user device relative to a reference frame, according to some embodiments.

At 202, an inertial measurement system receives motion information about motion and/or position of a user device from an inertial measurement device or other system included in the user device. At 204, the inertial measurement system also receives motion information about a reference frame (e.g. a vehicle) within which the user device is located. In some embodiments, the motion information about the reference frame may be received from a visual inertial odometry (VIO) system that monitors motion of the reference frame or may be received from one or more inertial measurement devices that measure inertial motion of the reference frame. Additionally in some embodiments, the motion information about the user device may be received from a visual inertial odometry (VIO) system that monitors motion of the user device or may be received from one or more inertial measurement devices that measure inertial motion of the user device.

At 206, the inertial measurement system determines motion of the user device within the reference frame, wherein the determined motion of the user device within the reference frame is motion relative to the reference frame and does not include motion of the reference frame. In order to determine the relative motion of the user device relative to the reference frame, the inertial measurement system may subtract the motion of the reference frame, for example as included in motion information received at 204, from measured motion of the user device, for example as included in motion information received at 202, to result in relative motion of the user device, e.g. motion relative to the reference frame. For example, motion information for the user device may indicate that the user device is rotating 30 degrees to the right. Also, motion information for the reference frame may indicate that the reference frame is rotating 20 degrees to the right. In such a scenario, the inertial measurement system may subtract the motion of the reference (e.g. turning 20 degrees to the right) from the motion of the user device (e.g. turning 30 degrees to the right) to result in relative motion of the user device within the reference frame, for example turning 10 degrees to the right (e.g. 30 degrees-20 degrees=10 degrees). In a similar manner, motion in other directions such as motion in the X, Y, and Z directions and angular motion about the X, Y, and Z axis may be compared, wherein motion of the reference frame is subtracted from motion of the user device to result in relative motion of the user device within the reference frame in each of the respective directions.

In some embodiments, a visual inertial odometry (VIO) system and an inertial measurement system of a user device may be a common system, or, in other embodiments, a visual inertial odometry (VIO) system may determine "absolute" motion of a user device and an inertial measurement system of the user device may determine relative motion of the user device by subtracting reference frame motion from the absolute motion of the user device.

In some embodiments, relative motion of a user device may be determined at a high frequency, such as a frequency from 100-1,000 Hz. However, at a lower frequency, the relative motion determined based on inertial measurement device measurements may be updated or calibrated based on motion determined based on captured images from a camera. For example, at 208, an inertial measurement system determine if a calibration interval has been reached. For example, calibration may be performed at a lower frequency than a frequency at which inertial motion is measured via inertial measurement devices. For example, in some embodiments, calibration may be performed at a frequency from 1-30 Hz, whereas measurement may be performed at a frequency from 100-1,000 Hz.

If a calibration interval is not reached, at 210, the determined relative motion of the user device determined at 206 is reported as the relative motion of the user device within the reference frame. For example, other applications implemented on a user device, such as a VR application or an AR application may receive the reported relative motion of the user device reported by the inertial measurement system. The process may then repeat and new motion information comprising inertial motion measurements from the inertial measurement device of the user device may be received at 202 and new motion information about the reference frame may be received at 204. In some embodiments, the relative motion of the user device within the reference frame may be reported to a mixed reality (MR) application implemented at least in part on the user device. For example, a mixed reality application may mix information or representations of the environment in which the user device is located with computer generated content.

If a calibration interval has been reached, at 212, the inertial measurement system performs a motion calibration for relative motion of the user device relative to the reference frame and/or for position of the user device. The calibration may be performed based on images captured from a camera that views objects that move with the reference frame. For example, a camera included in the user device or otherwise mounted within the reference frame may capture multiple images that include one or more reference objects that move with the reference frame. For example, in embodiments in which the reference frame is a vehicle, reference objects may include fixed objects within the vehicle, such as a rearview mirror frame, a head rest, a visor, a dashboard, a steering wheel, etc.

In some embodiments, in order to perform the calibration, the inertial measurement system may capture multiple images that include the reference object. The inertial measurement system may then compare a location of the reference object in the images to movement of the user device determined based on inertial measurement device measurements. For example, if a user is seated in a seat and a distance to a head rest is the same across multiple images, but inertial measurement device measurements indicate that the user device is moving towards the head rest, the relative motion of the user device may be calibrated to take into account drift resulting from the inertial measurement device measurements. Also, in some embodiments, instead of or in addition to comparing distances to reference objects, an inertial measurement system may compare velocities or accelerations towards or away from reference objects determined based on comparing velocities or accelerations determined based on images to velocities or accelerations determined based on inertial measurement device measurements to determine calibration values for velocity or acceleration.

Note that when calibrating relative motion of a user device it is important that objects selected as reference objects move with the reference frame. For example, if an object outside of a reference frame, such as a vehicle, were to be selected as a reference object, such as a passing car viewable outside a window of the vehicle, the changing distance to the passing car across multiple captured images may at least be attributable to motion of the passing car, which would not provide an accurate reference when calibrating motion of the user device within the reference frame, e.g. within the vehicle.

At 212 the determined relative motion and/or position of the user device is adjusted based on the calibration performed at 212. For example, the calibration may indicate that error in a position of the user device has accumulated since the last calibration interval such that the actual position of the user device in the reference frame as determined from camera data deviates from the position of the user device in the reference frame as determined from inertial measurement device measurements. This may occur because inertial measurement devices measure acceleration and the acceleration is integrated to determine velocity or position. For example, in each integration small amounts of error may be present and, because integration adds changes in position determined based on integrating acceleration to a previously determined position from a previous integration, the errors may add up over time between calibration intervals. These errors may give a user of a user device a sensation of drifting away. At a calibration interval, a current position of the user device may be adjusted to account for the accumulated drift errors. In some embodiments, adjustments may be phased in over time. This may avoid a "snap-back" sensation due to a position of the user device changing considerably in a single step change. Similar adjustments may also be made for velocity or acceleration. In some embodiments if drift or other errors follow a pattern, an inertial measurement system may further determine or more calibration adjustments to adjust how position and/or motion are being determined based on inertial measurement device measurements to account for the errors. Position correction and other adjustments are then used in determining relative motion of the user device for subsequent measurements. For example, the adjustments are applied to a current position of the user device used at 206 to determine relative motion of the user device based on inertial measurement device measurements. Therefore, the adjustments will affect reported determined relative motion reported at 210 for subsequent iterations.

Also, at 216, for the current iteration at the calibration interval, the adjusted relative motion of the user device in the reference frame is reported, for example to other applications of the user device that use the relative motion information. As discussed above, in some embodiments, adjustments may be phased in, such that portions of a necessary adjustment are applied in sequential iterations.

Figure 3:
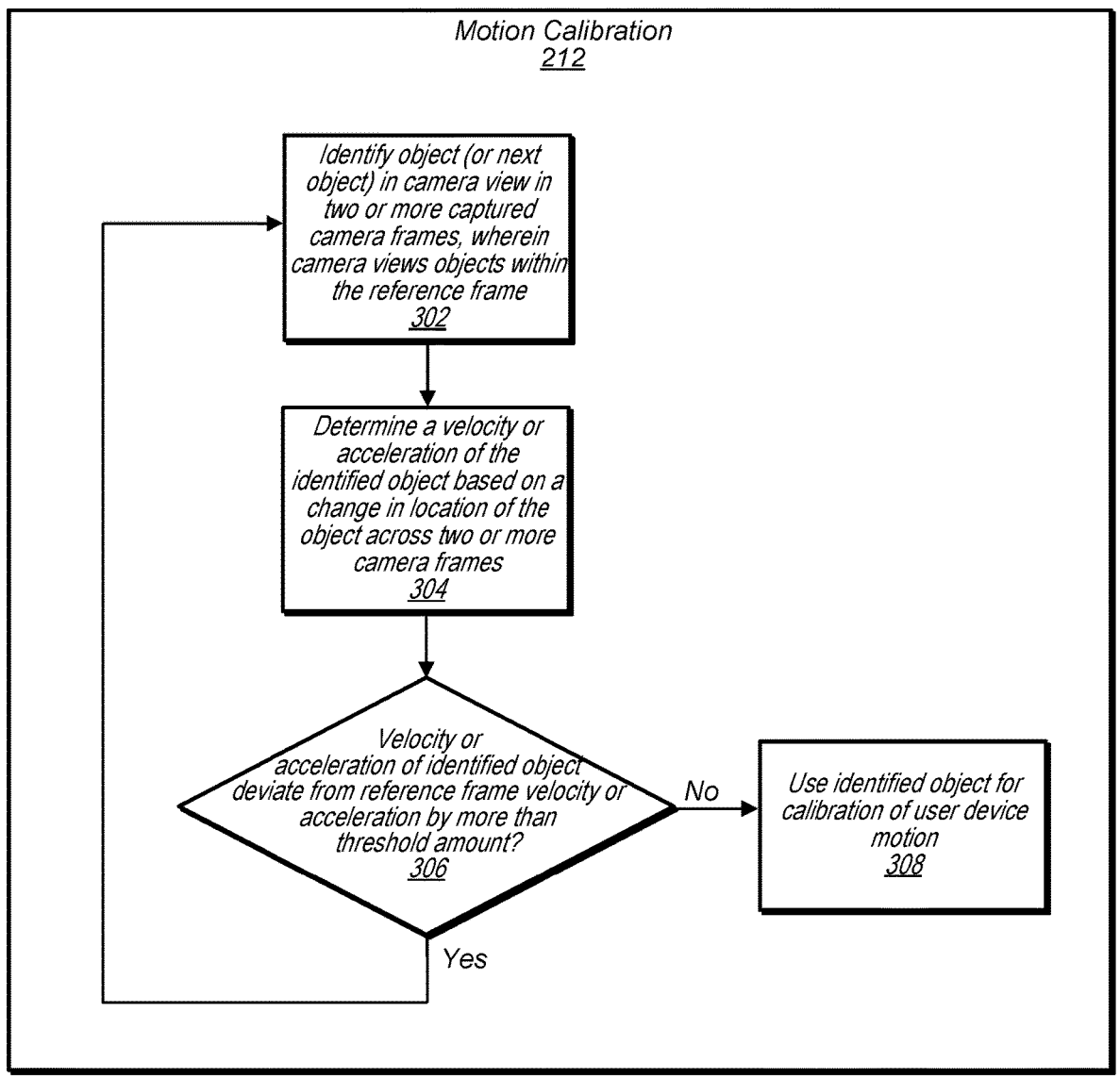
FIG. 3 is a flow diagram illustrating identifying an object to be used in calibrating motion measurements for a user device, according to some embodiments.

FIG. 3 is a flow diagram illustrating identifying an object to be used in calibrating motion measurements for a user device, according to some embodiments. The steps shown in FIG. 3 may be performed as part of performing motion calibration as described for 212 of FIG. 2, in some embodiments.

At 302, an object in a view of a camera is identified as a potential reference object for performing a motion calibration/position calibration for motion or position of the user device, such as performed at 212 in FIG. 2. The identified object is present in at least two captured images captured by the camera at two different points in time. Also, the camera is a camera positioned such that the camera captures images that include objects within the reference frame. For example, the camera may be mounted on a user device, such as a head mounted display and have a view that includes objects within a reference frame within which the user device is located, such as a vehicle. Also, the camera may be mounted on a user device, such as a phone, tablet, laptop, etc. and may have a view that includes objects within a reference frame within which the user device is located, such as a vehicle. However, since many reference frames, such as vehicles, may include transparent surfaces, such as windows, the camera may capture images that include objects that do not move with the reference frame, such as objects outside the window. Therefore, an inertial measurement system may distinguish between objects included in captured images that move with the reference frame from objects included in captured images that do not move with the reference frame, such as objects outside a window of a vehicle. In some embodiments, an inertial measurement system may distinguish between objects that move with a reference frame from objects that do not move with the reference frame based on velocity or acceleration. For example, if an object has a velocity that differs from a velocity of a reference frame by more than a threshold amount, it may be assumed that the object does not move with the reference frame.

At 304, a velocity or acceleration of an identified object is determined based on a change in location of the object in the captured images. Because the camera is moving with the reference frame (for example a camera included in a user device, such as a head mounted display), an object that also moves with the reference frame should have approximately zero velocity across the images. For example, if a user is seated in a passenger seat, a rearview mirror in front of the user that is captured in a camera image captured by a camera included in a user device should not move relative to the user (e.g. should not have a considerable velocity). Note that because the user may move slightly the identified object may have some velocity across the images, but it should be small as compared to velocities of other objects outside the reference frame, such as passing vehicles.

At 306, it is determined if the velocity (or acceleration) of the identified object deviates from the velocity of the reference frame by more than a threshold amount. For example, if the object is determined to have a velocity of 10 mph wherein the camera capturing the images moves with the reference frame, the object velocity deviates from the reference frame velocity by 10 mph. In such situations, a threshold amount may be much smaller than 10 mph, and it may be determined that the identified object does not move with the reference frame based on the velocity (or acceleration) deviation exceeding the threshold amount. In such circumstances, a next object may be identified at 302 as a potential reference point object. Conversely, if it is determined that the identified object has a velocity that does not deviate from the reference frame velocity by more than the threshold amount the identified object may be used, at 308, as a reference object for calibration, such as described in 212.

In some embodiments, a threshold amount of deviation may depend on a velocity of the reference frame. For example, if the reference frame is moving at a high speed, a greater deviation threshold may be applied. For example, if a vehicle is moving at 50 mph, an object outside the vehicle, such as a tree may move at 50 mph relative to the reference frame and it may be somewhat easy to distinguish between objects that move with the reference frame and objects that do not move with the reference frame when moving at high speeds. However, when moving at slow speeds, for example a few inches per minute, a speed at which the user device moves within the reference frame may be similar to a speed at which objects outside of the reference frame move relative to the reference frame. Thus, in such circumstances, a lower threshold for motion deviation may be applied. Also, in such circumstances, a velocity of the identified object may be determined taking into account motion of the user device within the reference frame.

In some embodiments, in addition to, or instead of identifying reference objects based on velocity or acceleration, an inertial measurement system may identify a reference object based on a type of the object.

Figure 4:
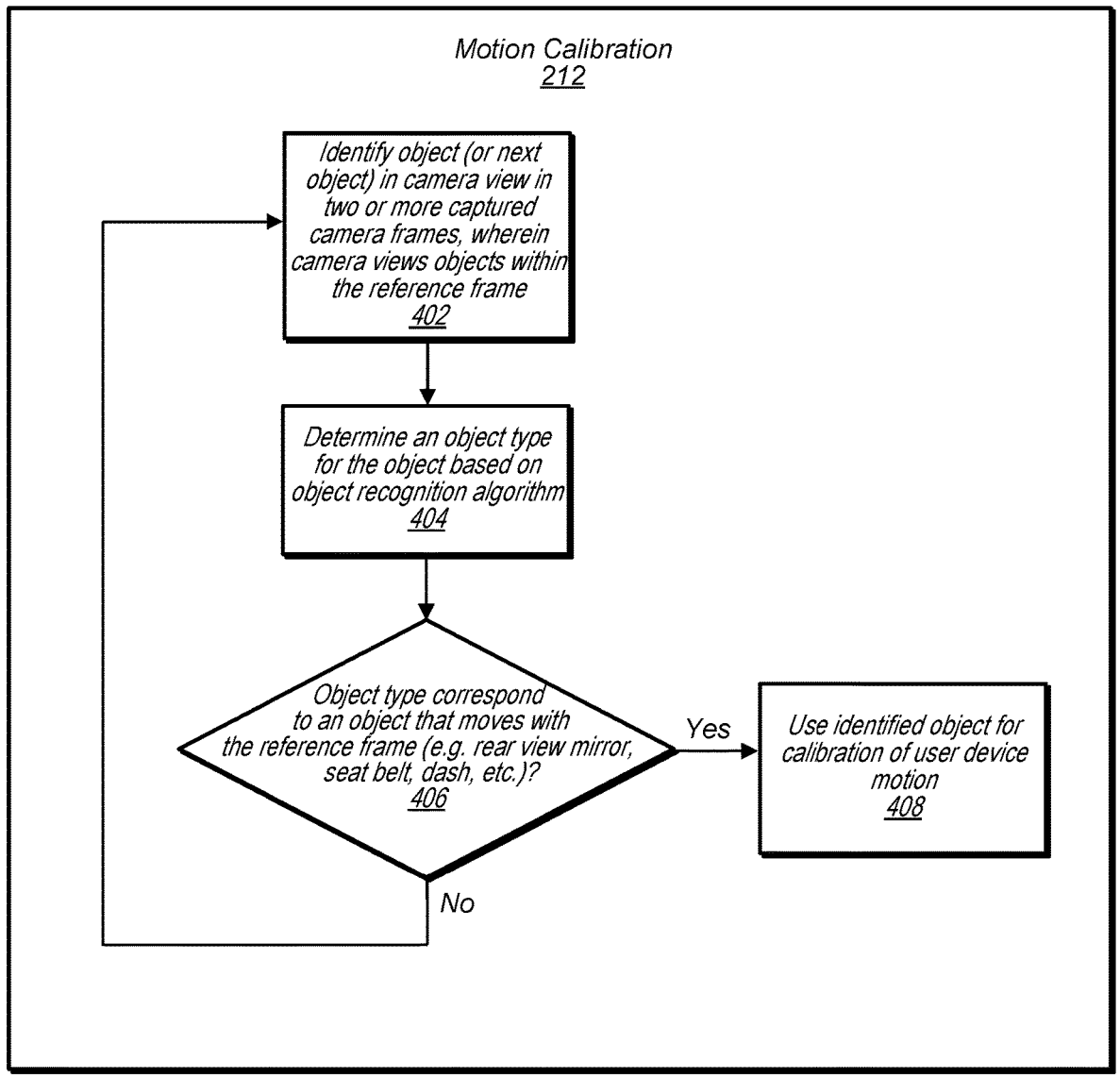
FIG. 4 is a flow diagram illustrating identifying an object to be used in calibrating motion measurements for a user device, according to some embodiments.

For example, FIG. 4 is a flow diagram illustrating identifying an object to be used in calibrating motion measurements for a user device, according to some embodiments. The steps shown in FIG. 4 may be performed as part of performing motion calibration as described for 212 of FIG. 2, in some embodiments.

At 402, an inertial measurement system identifies an object in a view of a camera as a potential reference object for performing a motion calibration/position calibration for motion or position of the user device, such as performed at 212 in FIG. 2. The identified object may be present in at least two captured images captured by the camera at two different points in time. Also, the camera is a camera positioned such that the camera captures images that include objects within the reference frame. For example, the camera may be mounted on a user device, such as a head mounted display and have a view that includes objects within a reference frame within which the user device is located, such as a vehicle. Also, the camera may be mounted on a user device, such as a phone, tablet, laptop, etc. and may have a view that includes objects within a reference frame within which the user device is located, such as a vehicle.

At 404, the inertial measurement system or another system operating on the user device, determines an object type for the identified object based on an object recognition algorithm. For example, the inertial measurement system or another system may store a set of characteristics for different objects and may identify a type for a given object based on the characteristics of the given object. For example, a tree may have characteristics that are distinct from a car and an inertial measurement system or other system may be able to distinguish between a tree object type and a car object type. In some embodiments, various object types may be supported. Also, in some embodiments, if an object type for an identified object cannot be determined, a next object may be identified instead of the object for which an object type could not be determined.

At 406, it is determined if the object type of the identified object corresponds to an object type for objects that move with the reference frame. For example, the object type may be determined to be a rearview mirror frame, a head rest, a visor, a dashboard, a steering wheel, etc. and may be used as a reference object at 408. Conversely an object type of the identified object may be determined to be an object type of an object that does not move with the reference frame such as a tree, building, another vehicle, etc. and a next object may be identified at 402.

Figure 5A:
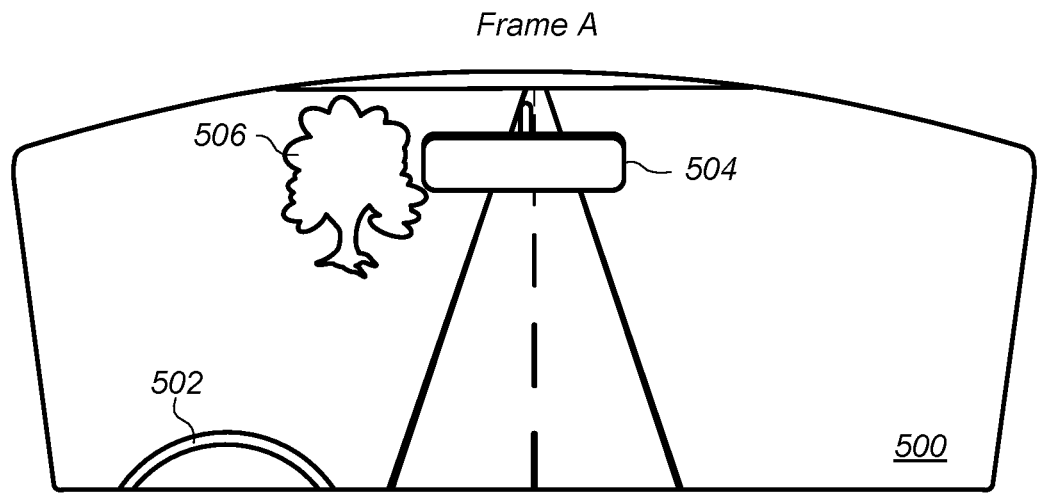
FIGS. 5A and 5B illustrate a view of a camera used to identify an object for calibrating motion measurements for a user device, according to some embodiments.
Figure 5B:
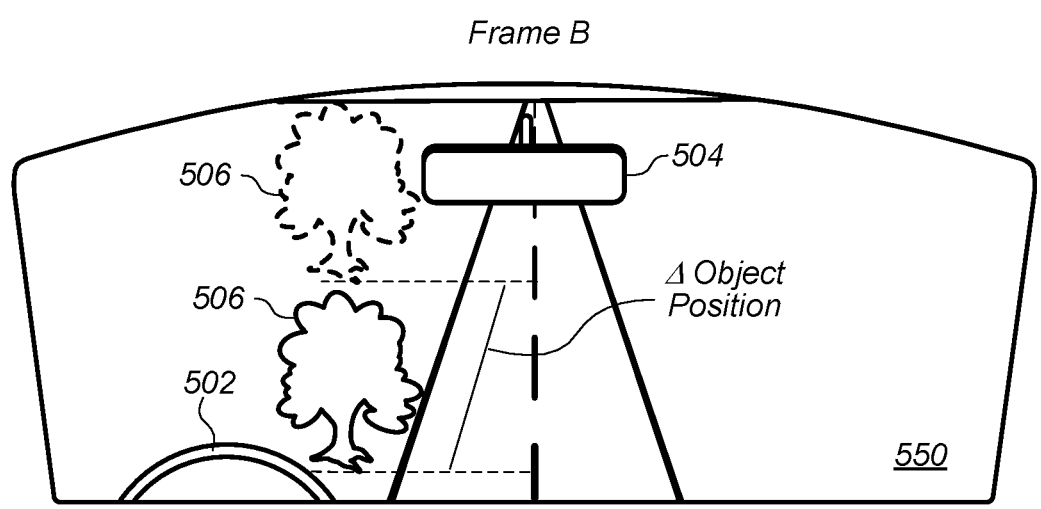

For example, FIGS. 5A and 5B illustrate a view of a camera used to identify an object for calibrating motion measurements for a user device, according to some embodiments.

In some embodiments, an inertial measurement system that utilizes object type identification may select reference objects based on type. For example, in camera scene 500, the inertial measurement system or another system may identify steering wheel 502 and rearview mirror frame 504 as objects having object types that move with a reference frame and may use the objects as reference points for performing a calibration as described in 212 of FIG. 2. Conversely, the inertial measurement system or other system may identify tree 506 as an object having an object type that does not move with a reference frame, such as a vehicle and may exclude tree 506 from being used as a reference point for performing a calibration of the user device motion relative to the reference frame.

In some embodiments, an inertial measurement system that utilizes velocity or acceleration object identification may exclude a tree, such as tree 506 from being used as a reference object based on a velocity or acceleration of the reference frame relative to the tree (that does not move with the reference frame). For example, a velocity may be determined based on a change in object position across images such as shown in camera scene 500 in FIG. 5B and an amount of time between when the images were captured. As can be seen, tree 506 changes position between the captured image illustrated in camera scene 500 in FIG. 5A and the captured image illustrated as camera scene 550 in FIG. 5B. However, steering wheel 502 and rearview mirror frame 504 do not significantly change position, e.g. do not have a meaningful velocity between the captured image illustrated as camera scene 500 in FIG. 5A and the captured image illustrated as camera scene 550 in FIG. 5B. Thus, an inertial measurement system may distinguish between the tree 506 that does not move with the reference frame and the steering wheel 502 and the rearview mirror frame 504 that do move with the reference frame. A process, such as described in FIG. 4 may be used to distinguish between objects that move with a reference frame and objects that do not move with a reference frame based on respective velocities or accelerations of the objects.

Figure 6:
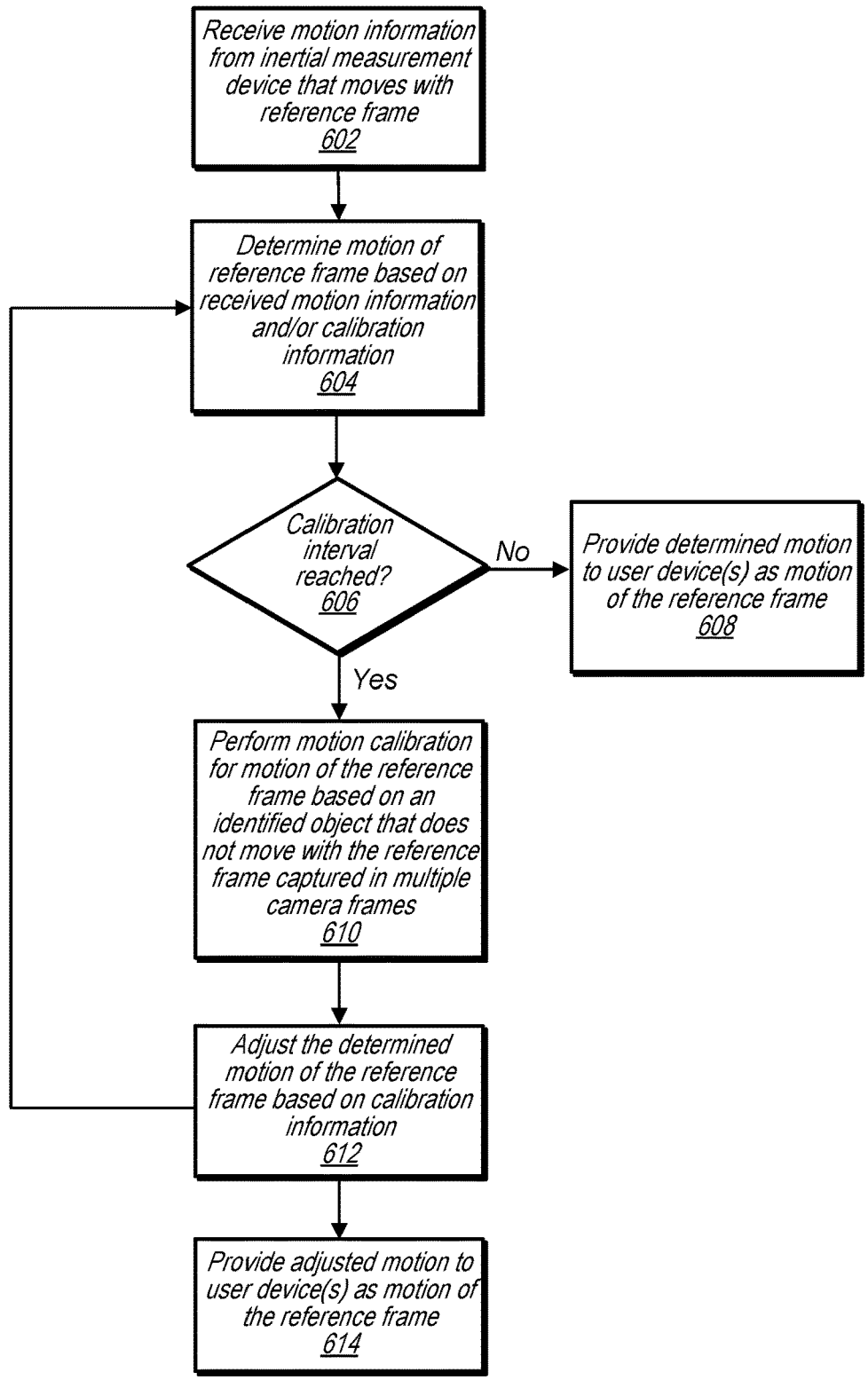
FIG. 6 is a flow diagram illustrating determining motion of a reference frame and providing motion information to a user device, according to some embodiments.

FIG. 6 is a flow diagram illustrating determining motion of a reference frame and providing motion information to a user device, according to some embodiments.

At 602, a visual inertial odometry (VIO) system receives motion information from inertial measurement devices that move with a reference frame. In some embodiments, the VIO system may be included in an inertial measurement system as discussed above with regard to FIGS. 2-5 or may provide motion information about motion of a reference frame to an inertial measurement system as described above in regard to FIGS. 2-5.

At 604, the VIO system determines motion of the reference frame (e.g. vehicle) based on the received motion information from the inertial measurement devices. Additionally, as discussed in more detail below, the VIO system may determine the motion of the reference frame based on received or determined calibration information.

At 606 the VIO system determines if a calibration interval has been reached. For example, calibration may be performed at a lower frequency than a frequency at which inertial motion is measured via inertial measurement devices. For example, in some embodiments, calibration may be performed at a frequency of 1-30 Hz, whereas measurement may be performed at 100-1,000 Hz. In some embodiments, a VIO system may perform a calibration each time a reference frame, for example a vehicle, comes to a stop and while the vehicle remains stopped. In such embodiments, the ground below the vehicle may be used as a reference point.

If a calibration interval is not reached, at 608, the determined motion of the reference frame determined at 604 is reported as the motion of the reference frame, for example to a user device or to a component of a user device that determine motion of the user device relative to the reference frame.

If a calibration interval has been reached, at 610 the VIO system performs motion calibration using captured images from a camera that has a view of a scene external to the reference frame. The VIO system may identify a stationary object external to the reference frame to use as a reference point for determining calibration information. The reference point may be included in at least two captured images captured by the camera at different times.

At 612, the determined motion of the reference frame may be adjusted based on the calibration information. Additionally, the calibration information may be used at 604 to determine motion of the reference frame in subsequent iterations.

At 614, the determined motion of the reference frame may be adjusted based on the calibration information for the current iteration, and the adjusted motion information may be provided to a user device for use in determining relative motion relative to the reference frame.

While a VIO system described in regard to FIG. 6 determines motion of a reference frame and uses stationary objects outside of the reference frame as reference points, a VIO algorithm used to determine the motion of the reference frame as described in FIG. 6 may be similar to a VIO algorithm used to determine motion of a user device, as described in regard to FIG. 2. However, in the case of determining motion of a reference frame as described in FIG. 6, the VIO algorithm may determine absolute motion of the reference frame, as opposed to relative motion as is determined for a user device in FIG. 2.

Figure 7:
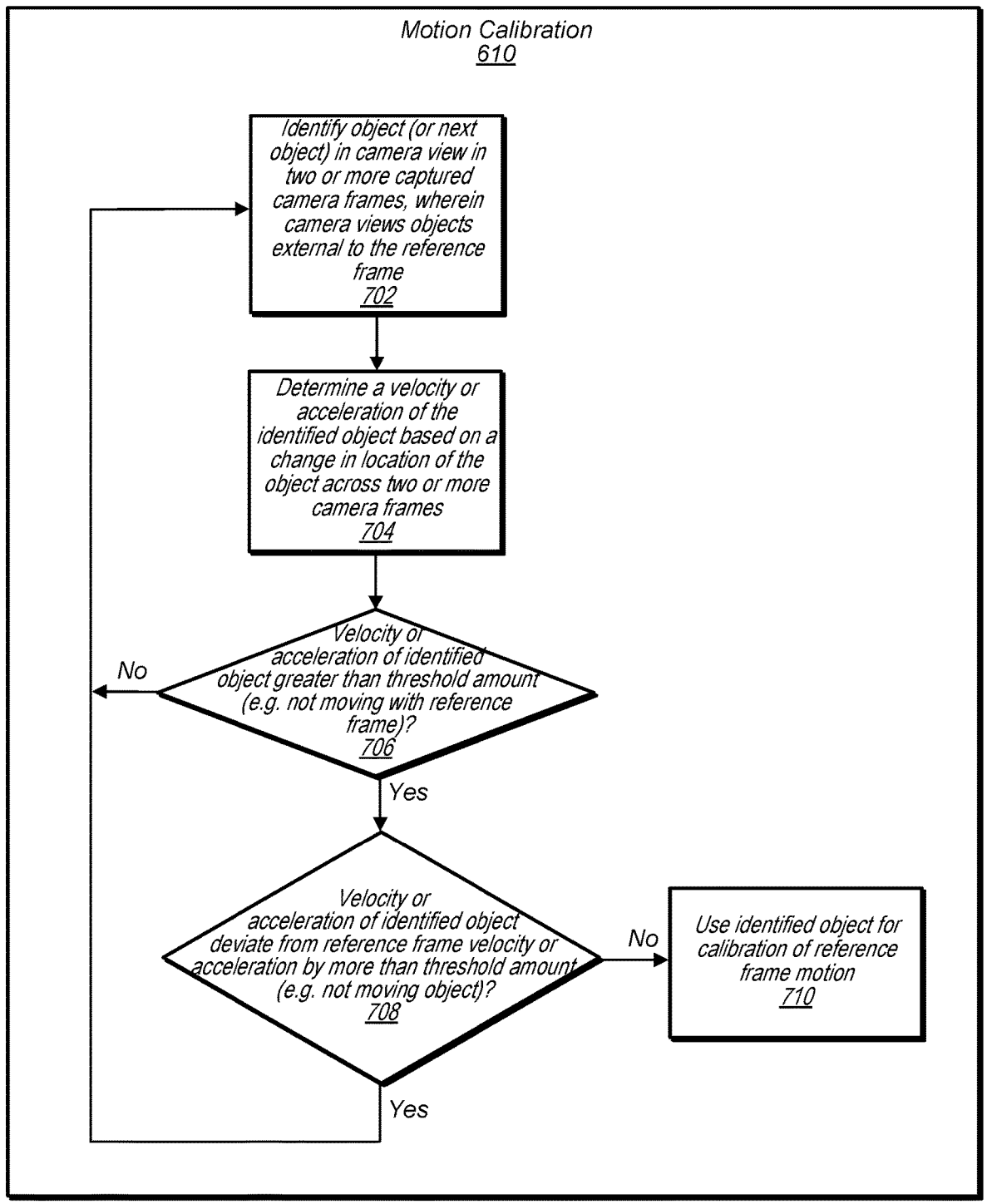
FIG. 7 is a flow diagram illustrating identifying an object for calibrating motion measurements for a reference frame, according to some embodiments.

FIG. 7 is a flow diagram illustrating identifying an object for calibrating motion measurements for a reference frame, according to some embodiments.

At 702, the VIO system or another object recognition system that works with the VIO system, identifies an object in a camera view of a scene external to the reference frame. In some embodiments, the camera may be mounted on an exterior of a vehicle, such as backup camera 124 shown in FIG. 1. In other embodiments, the camera may be located within a vehicle and have a view of a scene outside of the vehicle. For example, a camera may be included in a phone, tablet, laptop, etc. positioned in a vehicle such that the camera has a view outside a window of the vehicle. For example a phone may be mounted in a structure on a dash of a vehicle such that a camera on a backside of the phone views a scene outside the front windshield of the vehicle.

At 704, a velocity of the reference frame (e.g. a vehicle) is determined based on a change of location/position of an identified object in two or more captured images captured by the camera at two or more different points in time. The velocity may be determined based on a change in location of the object in the images and an amount of time between when the images were captured. Additionally, in some embodiments, an acceleration of the reference frame may be determined in a similar manner.

At 706, it is determined if the velocity of the identified object is greater than a threshold amount. This may ensure that the identified object is an object external to the reference frame. For example, from the perspective of the camera, objects within the reference frame, such as a front bumper, for example, will have zero or little velocity, whereas objects external to the vehicle will appear to have a velocity that corresponds to the velocity at which the vehicle is passing the objects. If the identified object does not have a velocity greater than the threshold velocity, a next object may be identified at 702, and the process may repeat for the next identified object.

At 708, it is determined if the velocity of the identified object deviates from the velocity of the reference frame by more than a threshold amount. This may be useful to determine if the identified object is a stationary object, such as a tree, building sign, etc. or if the identified object is a moving object, such as another vehicle. The velocity of the reference frame as determined based on inertial measurement device measurements may be compared to a velocity determined based on the identified object in the two or more captured images captured at different times. If the velocities vary by more than a threshold amount, the identified object may not be used as a reference object and another object may be identified at 702 and the process may repeat. If the velocities do not vary by more than the threshold amount, the identified object may be used to determine calibration information as described in 610.

In some embodiments, a velocity or acceleration of the identified object may be determined based on a percentage change in the object between camera frames. In some embodiments, a velocity or acceleration of the identified object may be determined based on a change in position of the identified object between camera frames. In some embodiments, other suitable techniques for determining a velocity or acceleration of an object based on captured images may be used.

In some embodiments, in addition to, or instead of identifying reference objects for determining a velocity or acceleration of a reference frame based on velocity or acceleration, a VIO system may identify a reference object based on a type of the object.

Figure 8:
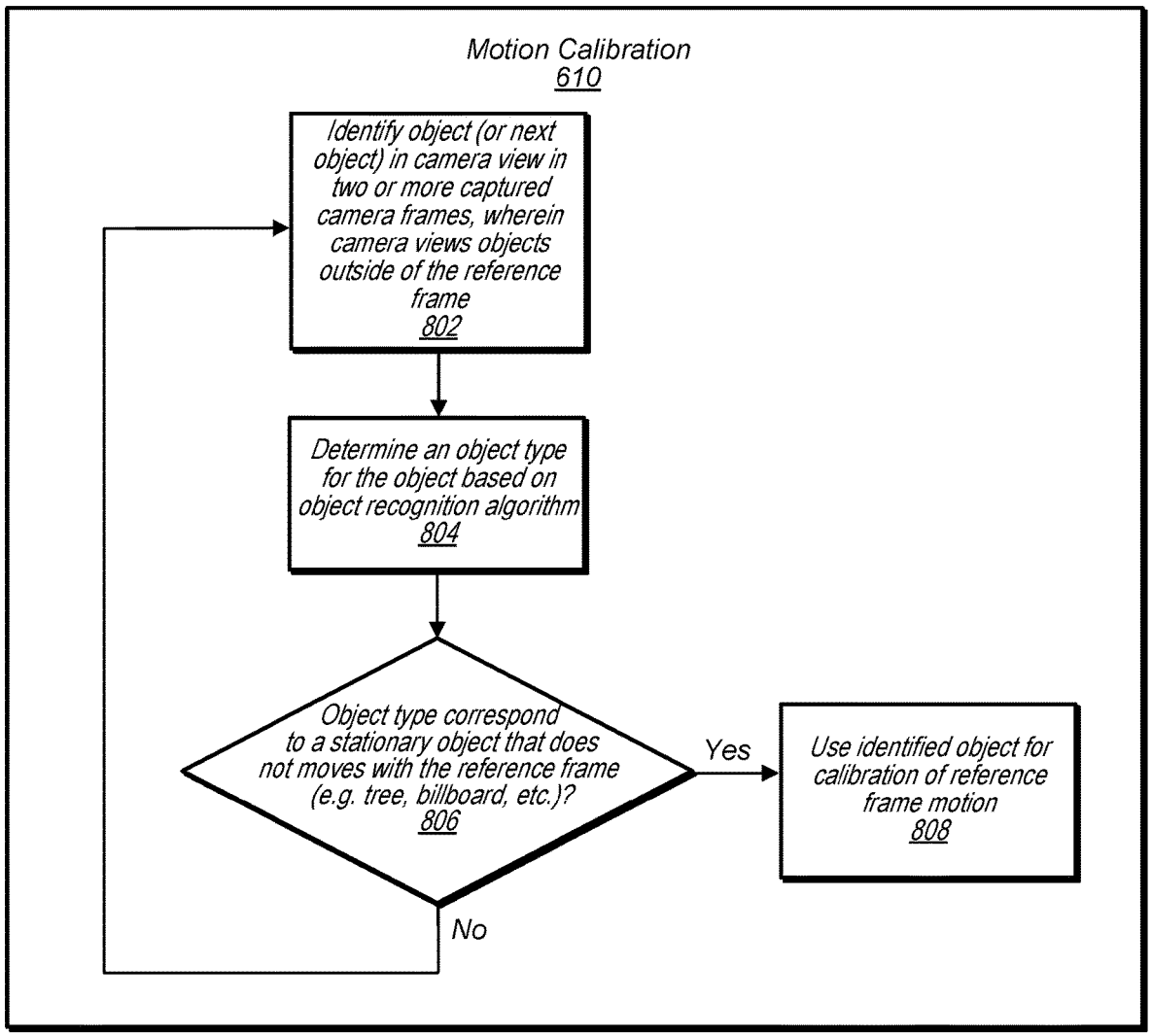
FIG. 8 is a flow diagram illustrating identifying an object for calibrating motion measurements for a reference frame, according to some embodiments.

For example, FIG. 8 is a flow diagram illustrating identifying an object for calibrating motion measurements for a reference frame, according to some embodiments.

At 802, the VIO system or another object recognition system that works with the VIO system, identifies an object in a camera view of a scene external to the reference frame. In some embodiments, the camera may be mounted on an exterior of a vehicle, such as backup camera 124 shown in FIG. 1. In other embodiments, the camera may be located within a vehicle and have a view of a scene outside of the vehicle. For example, a camera may be included in a phone, tablet, laptop, etc. position in a vehicle such that the camera has a view outside a window of the vehicle. For example a phone may be mounted in a structure on a dash of a vehicle such that a camera on a backside of the phone views a scene outside the front windshield of the vehicle.

At 804, an object type of the identified object is determined based on an object recognition algorithm. For example, the VIO system or another system may store a set of characteristics for different objects and may identify a type for a given object based on the characteristics of the given object. For example, a tree may have characteristics that are distinct from a car and an inertial measurement system or other system may be able to distinguish between a tree object type and a car object type. In some embodiments, various object types may be supported. Also, in some embodiments, if an object type for an identified object cannot be determined, a next object may be identified instead of the object for which an object type could not be determined.

At 806, it is determined whether an object type of the identified object corresponds to a stationary object that does not move with the reference frame, such as a tree, billboard, sign, building, etc. If the object type does not correspond to a stationary object external to the reference frame (e.g. the vehicle), then another object is identified at 802 and the process repeats. If the object type of the identified object corresponds to a stationary object external to the reference frame, the identified object may be used to determine calibration information as described in 610.

Figure 9A:
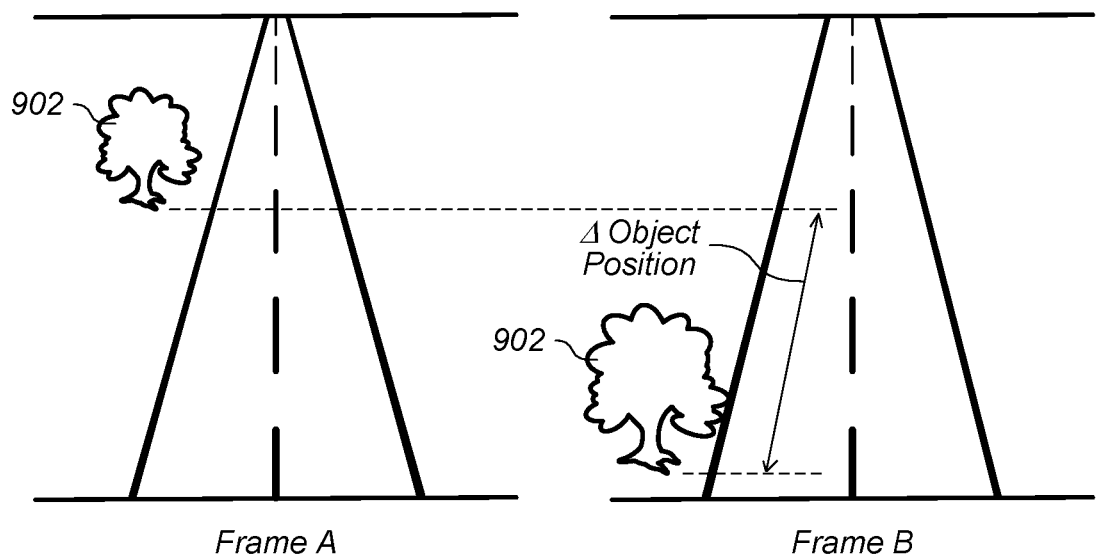
FIGS. 9A and 9B illustrate a view of a camera used to identify an object for calibrating motion measurements for a reference frame, according to some embodiments.
Figure 9B:
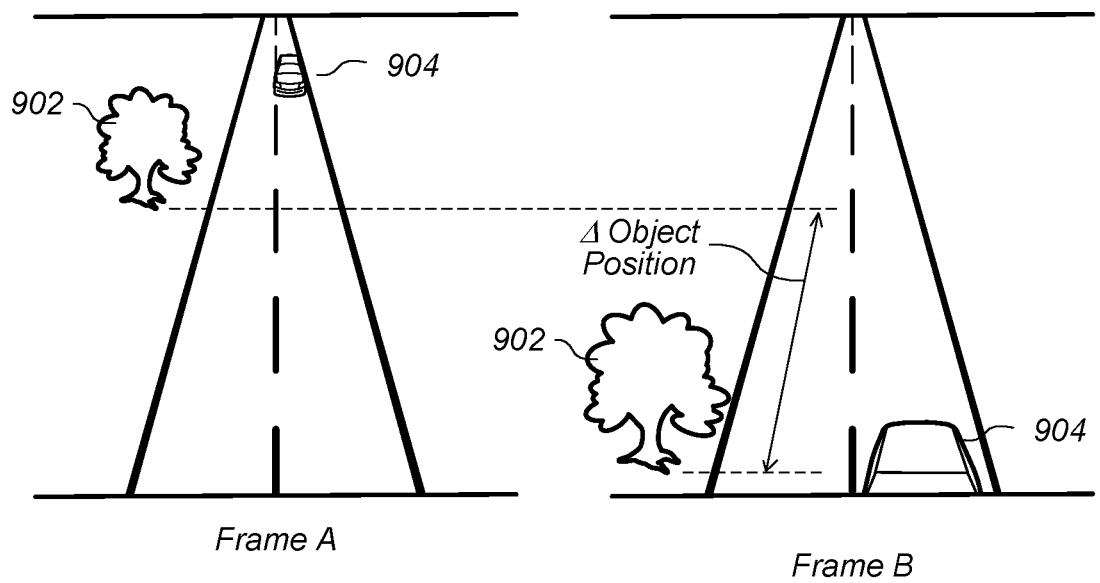

FIGS. 9A and 9B illustrate a view of a camera used to identify an object for calibrating motion measurements for a reference frame, according to some embodiments.

As described above, a stationary object that does not move with a reference frame may be used to determine calibration information for calibrating inertial measurements for a reference frame. For example, a stationary object such as tree 902 may be identified in two or more captured images and a change in position of the tree and an amount of time between when the images were captured may be used to determine a velocity or acceleration of the reference frame, wherein the determined velocity or acceleration of the reference frame is used for calibrating measurements from an inertial measurement device. However, a non-stationary object, such as vehicle 904, may be excluded from being used to determine a velocity of the reference frame for calibration. For example, a velocity of vehicle 904 may vary from the velocity of the reference frame as determined by an inertial measurement device such that the velocity exceeds a threshold amount of deviation, for example the velocity of vehicle 904 may not satisfy 708 as described in FIG. 7. Also, in embodiments that use object type identification, objects having object types corresponding to other vehicles may not be used as reference objects.

In some embodiments, in addition to or instead of using cameras to calibrate motion information for a reference frame, an inertial measurement system may use crowd-sourced motion information to determine or calibrate motion information for a reference frame.

Figure 10:
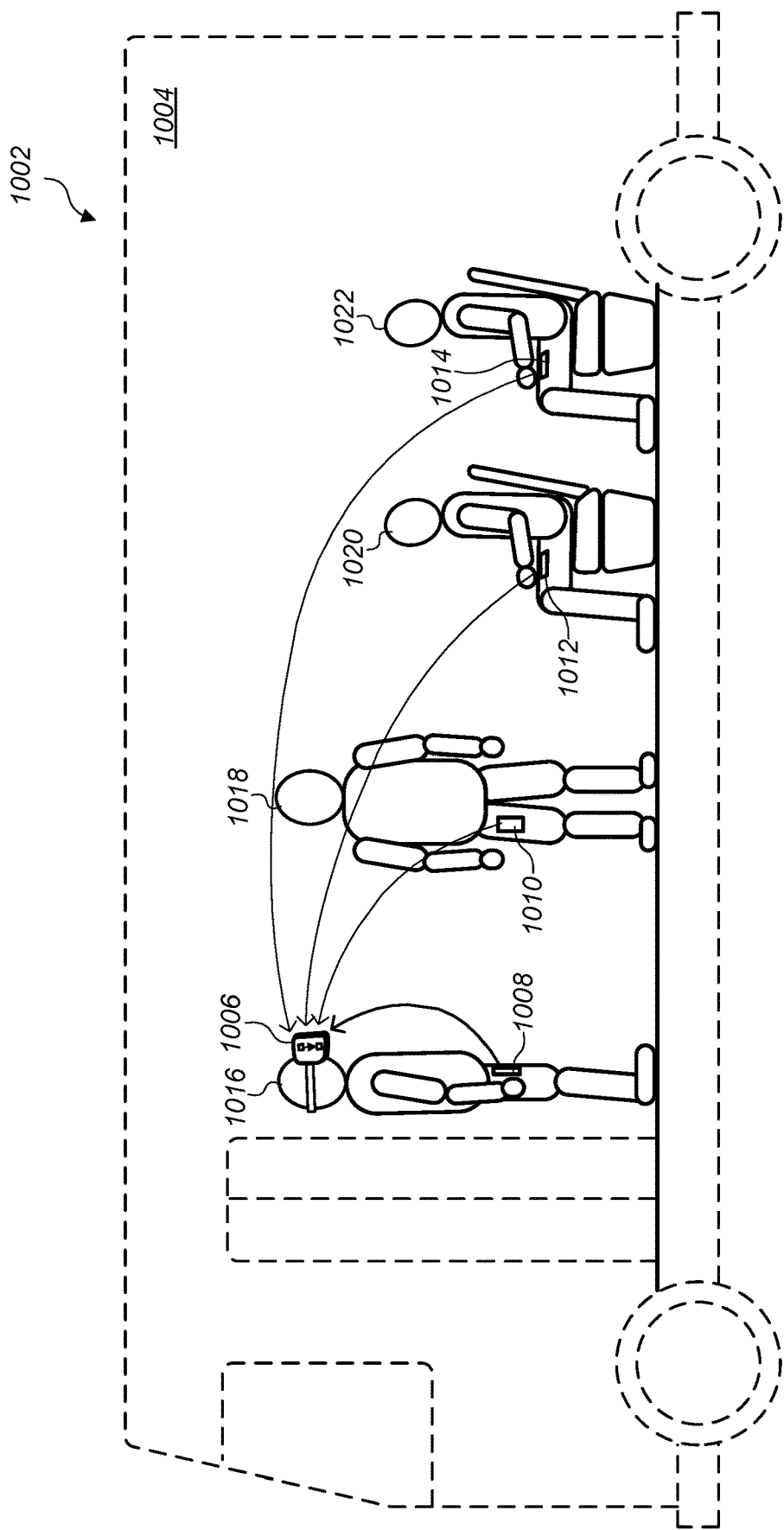
FIG. 10 illustrates multiple user devices in a common reference frame providing motion information for determining motion of the reference frame, according to some embodiments.

For example, FIG. 10 illustrates multiple user devices in a common reference frame providing motion information for determining motion of the reference frame, according to some embodiments.

Inertial measurement system 1002 in vehicle 1004 includes user device 1006, and other user devices 1008, 1010, 1012, and 1014. User device 1006 is a head mounted display being worn by user 1016 and user device 1008 is an additional user device in the pocket of user 1016. For example user device 1008 may be a phone or other portable user device. User device 1010 is a phone or other portable user device in the pocket of user 1018. Also, user devices 1012 and 1014 are phones or other portable user devices in the pockets of users 1020 and 1022, respectively.

In some embodiments, inertial measurement system 1002 may determine motion of user device 1006, e.g. a head mounted display, located within the reference frame of vehicle 1004, wherein the vehicle is non-stationary. Inertial measurement system 1002 may collect inertial measurement information from user devices 1008, 1010, 1012, and 1014 to determine motion of a reference frame, such as vehicle 1004. For example, user 1016 and 1018 may be moving in vehicle 1004 and users 1020 and 1022 may be seated and not moving. The inertial measurement system may be configured to filter out or otherwise disregard the motion of users 1016 and 1018 in vehicle 1004 by comparing motion measurements from multiple inertial measurement devices, such as user devices 1008, 1010, 1012, and 1014.

In some embodiments, a user device may be located in a public transportation vehicle that includes an inertial measurement device. The public transportation vehicle may broadcast inertial measurements of the public transportation vehicle to riders of the public transportation vehicle. Thus user devices may determine relative movements relative to the public transportation vehicle based on received inertial measurements broadcast to users of the public transportation vehicle. In some embodiments, a vehicle, such as a public transportation vehicle, may include predictive inertial data in inertial measurements broadcast to riders of the public transportation vehicle. For example, if a subway follows a set path, the subway may broadcast predicative inertial data about an upcoming bend in the track before actually passing through the bend in the track.

Figure 11:
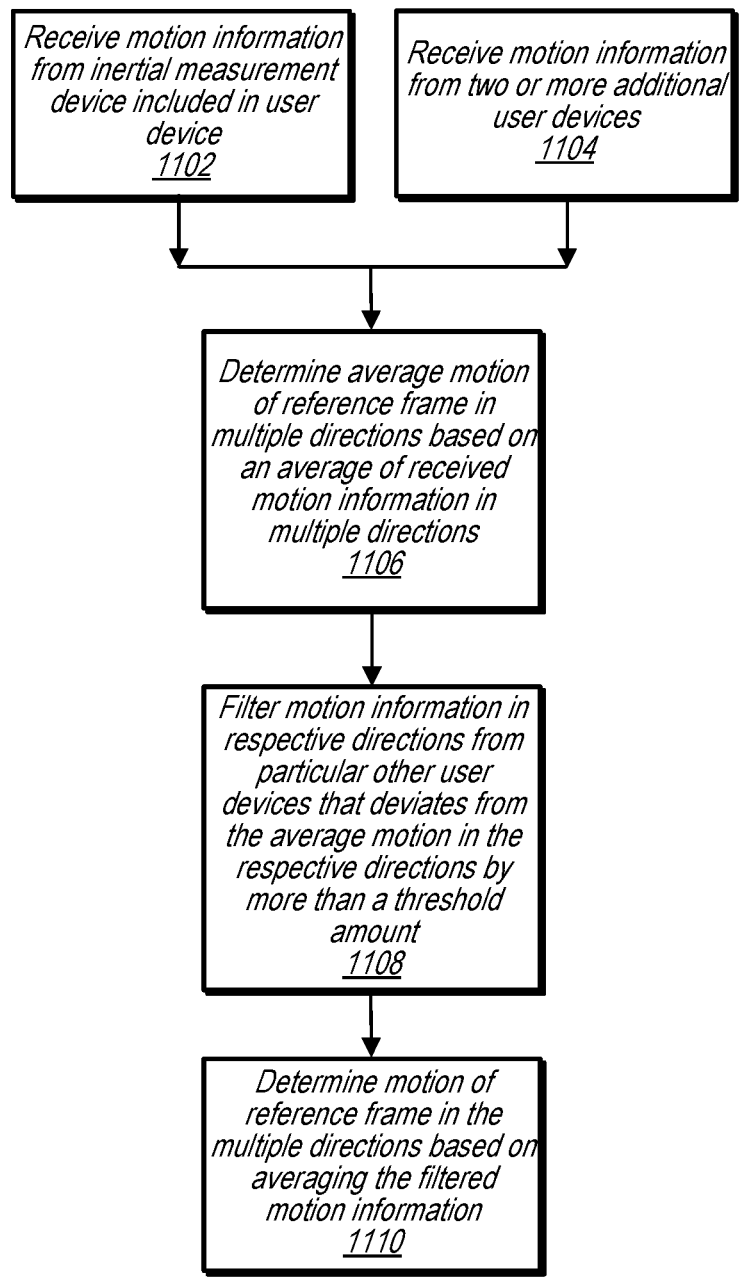
FIG. 11 is a flow diagram illustrating determining motion of a reference frame based on crowd-sourced motion information, according to some embodiments.

FIG. 11 is a flow diagram illustrating determining motion of a reference frame based on crowd-sourced motion information, according to some embodiments.

At 1102 motion information is received from inertial measurements of a user device for which inertial motion is to be determined. For example, motion information may be received from an inertial measurement device included in head mounted display 1006.

At 1104, motion information is received from inertial measurement devices of other user devices, such as user devices 1008, 1010, 1012, and 1014.

At 1106, average motion of the reference frame (e.g. vehicle 1004) is determined in multiple directions, for example, X, Y, and Z and angular motion about X, Y, and Z based on the received inertial measurements.

At 1108, motion of user devices other than the user device for which the relative motion is being determined that deviate from the average motion by more than a threshold amount is filtered out. At 1110, motion of the reference frame is determined based on the filtered motion of the other user devices. For example, if the motion of user device 1010 deviates from the average motion of user devices 1010, 1012, and 1014 by more than a threshold amount in the direction along the length of vehicle 1004, motion information from user device 1010 in that direction may be filtered out before determining motion of vehicle 1004. For example, user 1018 may be walking in the vehicle and the motion of the user walking may cause the motion of user device 1010 to deviate from the average motion of user devices 1010, 1012 and 1014 in that direction. Such averaging and filtering may avoid motion of user devices that move within a reference frame from being attributed to the reference frame.

In some embodiments, a user device such as user device 1006 may also perform calibrations based on captured image data. In some embodiments calibration information may be weighted based on robustness of the data. For example, image data and inertial measurement device data may be weighted based on robustness of the data. In some embodiments, weighting based on robustness of data may be used in any of the calibrations described herein.

Figure 12:
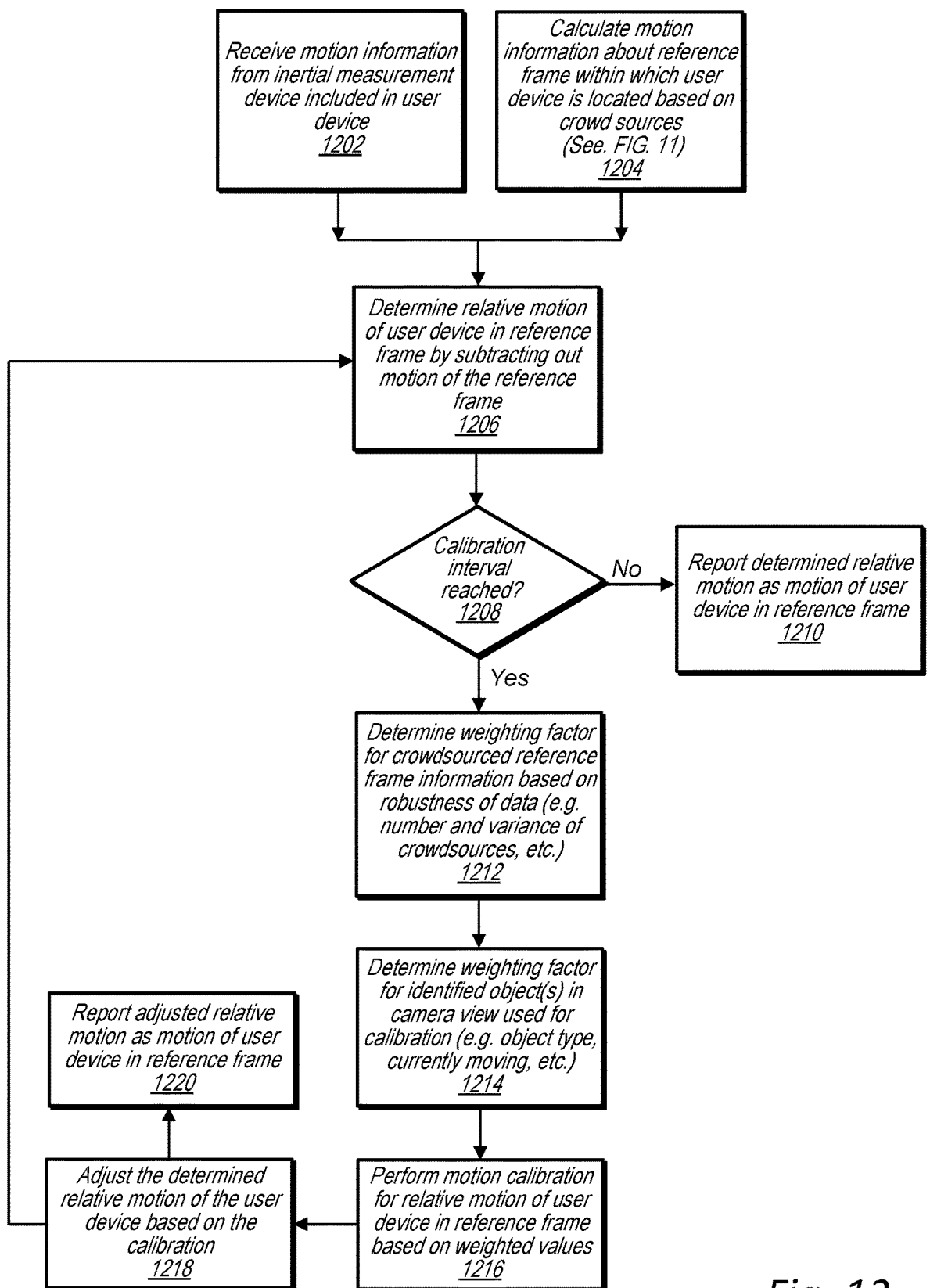
FIG. 12 is a flow diagram illustrating determining motion of a user device using weighting factors based on robustness of motion information, according to some embodiments.

FIG. 12 is a flow diagram illustrating determining motion of a user device using weighting factors based on robustness of motion information, according to some embodiments.

At 1202 motion information from an inertial measurement device included in a user device is received. At 1204 motion information about a reference frame within which the user device is located is calculated based on crowdsourced data. This may be done as described above in regard to FIG. 11.

At 1206, relative motion of the user device within the reference frame is determined by subtracting out the calculated motion of the reference frame.

At 1208, it is determined if a calibration interval has been reached. If a calibration interval has not been reached, at 1210 the relative motion determined at 1206 is reported to other applications on the user device as the relative motion of the user device within the reference frame.

If a calibration interval has been reached, at 1210 a weighting factor is determined for the crowdsourced reference frame information. The weighting factor may depend on the robustness of the crowdsourced reference frame information. For example if there are more sources of crowdsourced information or if there is less noise in the crowdsourced information, the crowdsourced information may be more robust and may be assigned a higher weight. In some embodiments, other factors corresponding to a degree of robustness of the crowdsourced data may be considered when assigning a weight to the crowdsourced data.

At 1214, a weighting factor for camera data is assigned. The camera data may include a reference object in two or more captured camera frames. The camera calibration data may be determined as described herein. In some embodiments, a camera such as a camera attached to user device 1006 may identify objects within vehicle 1004 for use in calibrating relative motion of user device 1006 and the camera may also identify stationary objects outside of vehicle 1004 for use in calibrating motion of a reference frame, such as vehicle 1004.

At 1216, calibration of the relative motion of a user device within a reference frame may be determined based on the weighted factors. For example, if there are numerous crowdsource user devices in the reference frame the crowdsourced data may be given a heavy weight as compared to camera data. In another scenario, there may be few crowdsource user devices and a camera may capture a well-known object type that provides a good reference point, such as a large tree, or there may be multiple reference objects in captured image data. In such a case camera data may be weighted more heavily than crowdsourced user device data. In some embodiments, other weighting considerations may be used.

At 1218 the determined relative motion of the user device within the reference frame (as determined at 1206) is adjusted. Also the calibration information is used at 1206 in subsequent iterations. At 1220 the adjusted relative motion of the user device is reported to other applications of the user device, such as a VR, AR, or MR application.

Figure 13A:
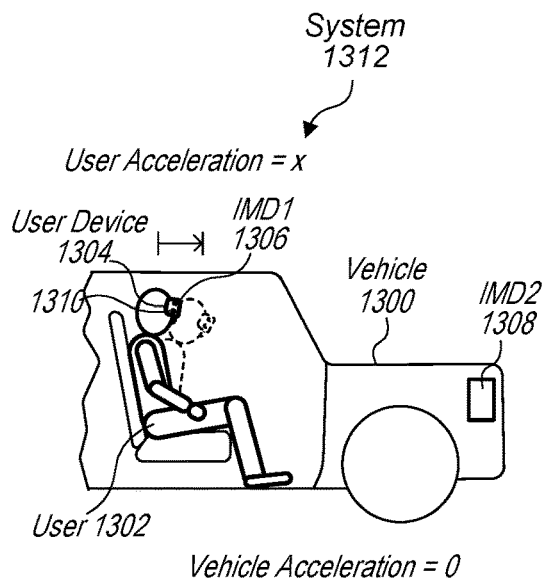
FIGS. 13A-13C illustrate examples of relative motion of a user device relative to a reference frame, according to some embodiments.
Figure 13B:
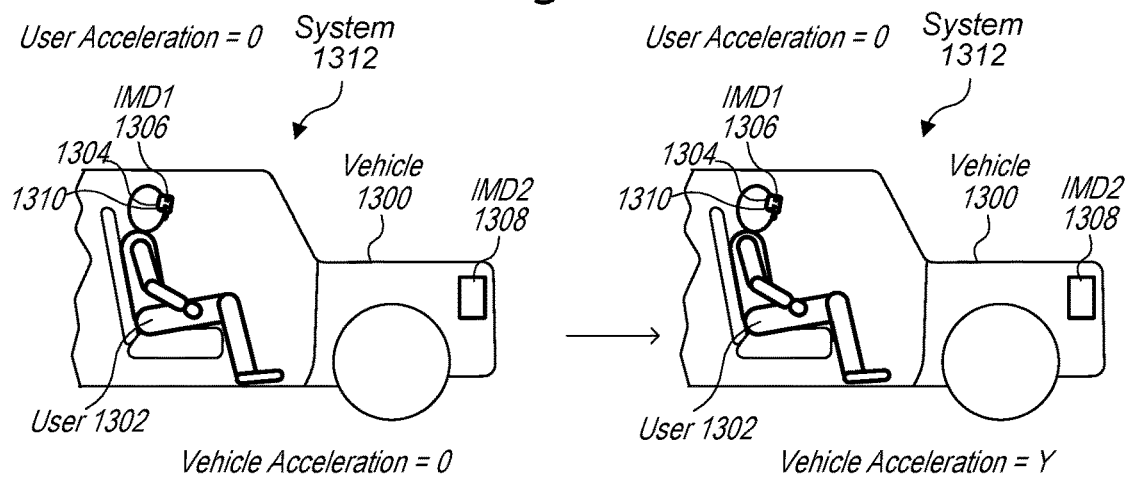
Figure 13C:
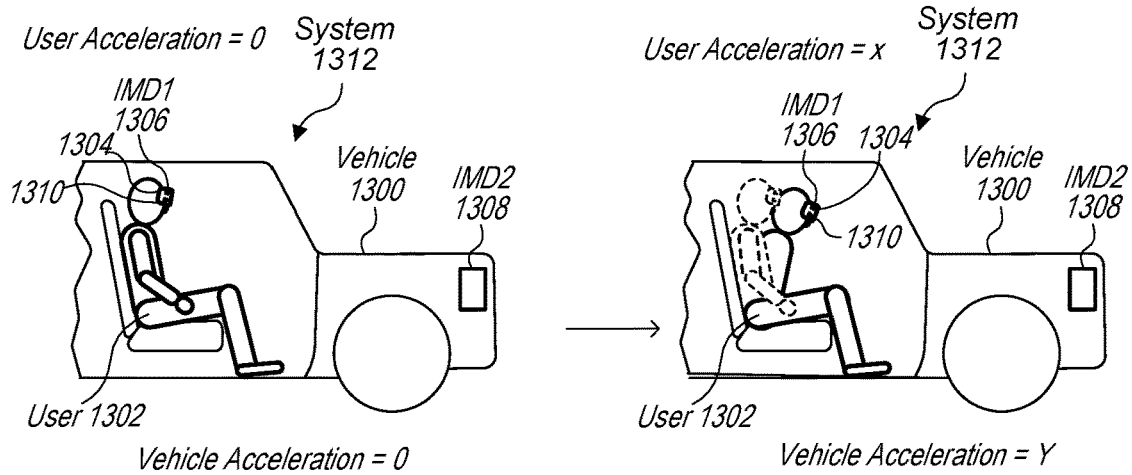

FIGS. 13A-13C illustrate examples of relative motion of a user relative to a vehicle reference frame, according to some embodiments.

In FIGS. 13A-13C a user 1302 is seated in a vehicle 1300. Vehicle 1300 is illustrated as an automobile but in some embodiments may be various other types of non-fixed reference frames, such as other types of vehicles or modes of transportation. User 1302 is wearing user device 1304, which is a head-mounted display that includes an inertial measurement device 1306. In addition, vehicle 1300 includes an additional inertial measurement device 1308 built into vehicle 1300. In some embodiments, additional inertial measurement device 1308 may be a portable device carried by user 1302 and coupled with vehicle 1300. In some embodiments, additional inertial measurement device 1308 may be a multi-purpose portable electronic device carried by user 1302 that is carried in such a way that the multi-purpose portable electronic device does not move with user 1302's head, or may be another type of device that includes an inertial measurement device and that is configured to move with vehicle 1300 without moving with user 1302's head. In some embodiments, user device 1304 may be other types of user devices such as gaming controllers, non-head mounted displays, control interfaces for vehicle entertainment and comfort controls, etc.

In some embodiments, a system 1312 implementing relative inertial motion measurement technology may include one or more processors 1310 included in user device 1304, separate from user device 1304 but included in vehicle 1300, or included in a separate device separate from user device 1304. In addition system 1312 includes inertial measurement device 1306 and additional inertial measurement device 1308. The one or more processors 1310 may be configured to receive inertial measurements from inertial measurement devices 1306 and 1308 in order to determine relative motion of user device 1304 or the part of user 1302's body to which user device 1304 is coupled.

In FIG. 13A, vehicle 1300 is at a stop and remains stopped. User 1302 is seated in vehicle 1300 and moves his head forward. Note that the movement of user 1302's head is exaggerated in FIG. 13A for clarity of illustration. In some embodiments, movement of user 1302's head may be more or less than illustrated in FIG. 13A. Because vehicle 1300 is stopped and remains stopped, the reference frame of vehicle 1300 remains fixed during the motion of user 1302's head. Thus, the one or more processors 1310 of system 1312 determine the relative motion of user device 1304 relative to the reference frame of vehicle 1300 to be equivalent to the inertial measurements received from inertial measurement device 1306. This is because vehicle 1300 is not in motion and inertial measurements from additional inertial measurement device 1308 indicate no motion of vehicle 1300.

In FIG. 13B, user 1302 is seated in vehicle 1300 and remains still in vehicle 1300, i.e. user 1302 does not appreciably move user 1302's head. At the same time, vehicle 1300 accelerates from a stopped position (e.g. no acceleration or velocity) to a moving state (e.g. acceleration=Y). Inertial measurement device 1306 measures the inertial movement of user 1302's head, which in this case includes the acceleration of vehicle 1300 (acceleration=Y). However, because user 1302 remains still and does not appreciably move user 1302's head there is not additional inertial movement of user 1302's head beyond the movement of vehicle 1300. Also, additional inertial measurement device 1308 measures the inertial movement of vehicle 1300 (acceleration=Y). In order to determine the relative movement of user device 1304 and user 1302's head to which user device 1304 is coupled the one or more processors 1310 of system 1312 subtract the inertial measurements received from additional inertial measurement device 1308 from the inertial measurements received from inertial measurement device 1306. For example, the one or more processors 1310 subtract acceleration Y measured by additional inertial measurement device 1308 from acceleration Y measured by inertial measurement device 1306 to determine that the inertial motion of user device 1304 and user 1302's head is zero when measured against the non-fixed reference frame of vehicle 1300. Note that in the examples in FIGS. 13A-13C inertial measurements have been simplified for purpose of illustration. In actual practice it is likely that user 1302's head would move at least some amount while vehicle 1300 is accelerating. Furthermore, in some embodiments, the one or more processors 1310 may further include a fudge factor when determining relative motion of user 1302's head due to natural responses to changes in movement that are not conscious movements by user 1302. For example, when vehicle 1300 accelerates, user 1302 may slightly move due to the motion of the vehicle without consciously attempting to move user 1302's head. For example, cushions in seats in vehicle 1300 may slightly compress due to forces resulting from the acceleration of vehicle 1300, or user 1302's body may sway with the motion of vehicle 1300 despite user 1302 looking in a particular direction without consciously changing the direction in which user 1302 is looking. A fudge factor may be used by the one or more processors 1310 to account for these slight non-conscious movements of user 1302 to provide a more stable viewing experience.

In FIG. 13C, user 1302 is seated in vehicle 1300 and moves his head forward. At the same time, vehicle 1300 accelerates from a stopped position (e.g. no acceleration or velocity) to a moving state (e.g. acceleration=Y). Thus in FIG. 13C there is both motion of vehicle 1300 and motion of user device 1304 and user 1302's head within the non-fixed reference frame of vehicle 1300. Additional inertial measurement device 1308 measures the acceleration of vehicle 1300 (acceleration=Y). Inertial measurement device 1306 measures the acceleration of vehicle 1300 (because user 1302 moves with vehicle 1300) and also measures the acceleration of user 1302's head within vehicle 1300. Thus inertial measurement device 1306 measures acceleration Y plus the acceleration of user 1302's head in addition to the acceleration of vehicle 1300. In order to determine the relative motion of user device 1304 and user 1302's head to which user device 1304 is coupled, the one or more processors subtract the inertial measurements from additional inertial measurement device 1308 from the inertial measurements from inertial measurement device 1306 (e.g. (acceleration Y+head acceleration)−(acceleration Y)). The difference between the inertial measurements from inertial measurement devices 1306 and 1308 indicate the relative motion of user device 1304 (and user 1302's head) within the reference frame of vehicle 1300. In some embodiments, inertial measurements may comprise more complex measurements of motion, e.g. inertial measurements may include motion in the X, Y, and/or Z direction along with angular motion about the X, Y, and/or Z axis.

Figure 14A:
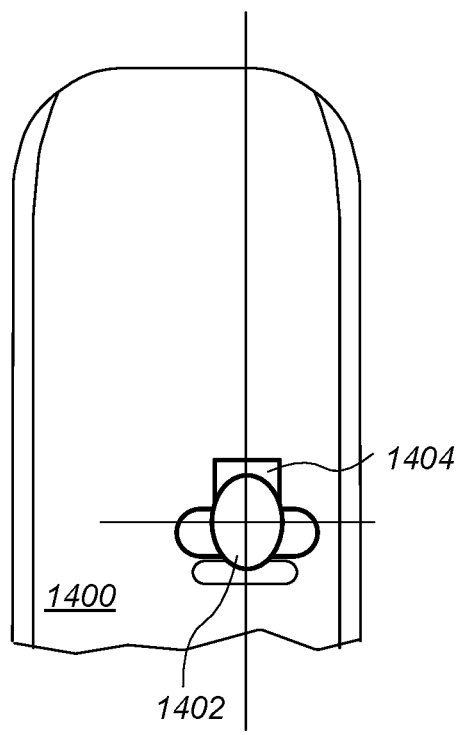
FIGS. 14A-14C illustrate examples of relative motion of a user device relative to a reference frame, according to some embodiments.
Figure 14B:
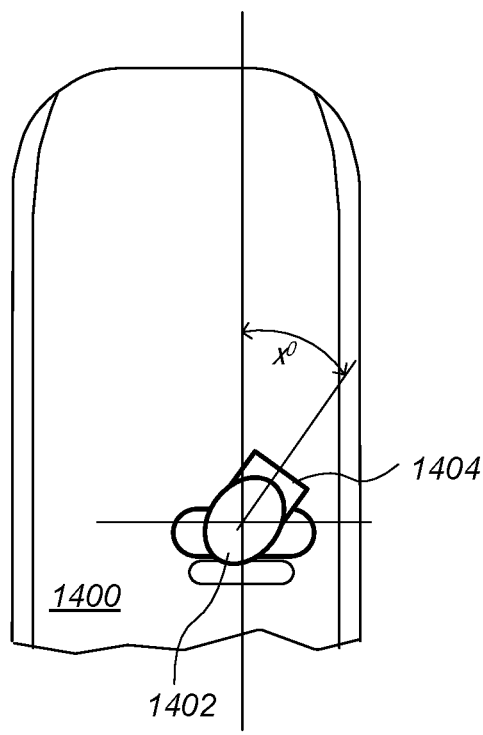
Figure 14C:
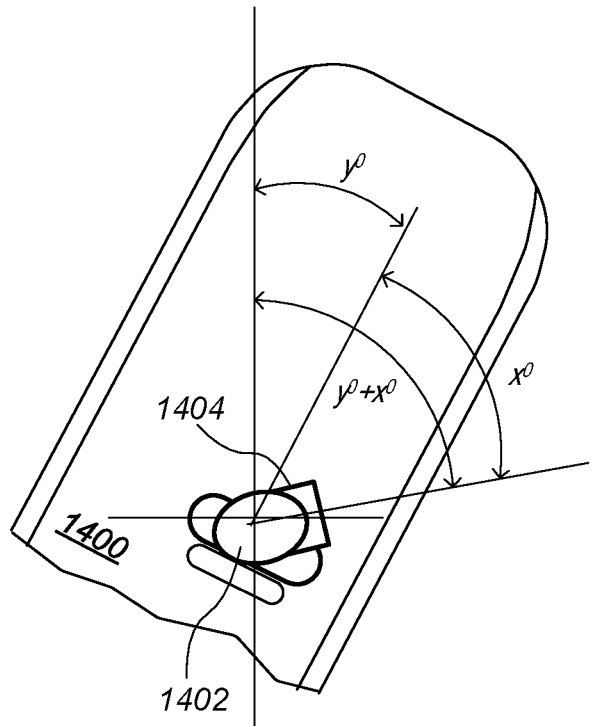

FIGS. 14A-14C illustrate examples of relative angular motion of a user relative to a vehicle reference frame, according to some embodiments. FIG. 14A illustrates angular motion about a Z-axis. However, a system or user device that implements relative inertial measurement technology may determine relative angular motion about other axis, such as the X-axis or Y-axis in a Cartesian coordinate system. User device 1404 illustrated in FIGS. 14A-14C may be the same as user device 1304 illustrated in FIG. 13 and may include processors 1310 and inertial measurement device 1306. Likewise vehicle 1400 may be the same as vehicle 1300 illustrated in FIG. 13 and include additional inertial measurement device 1308. Collectively user device 1404 and inertial measurement device 1308 of vehicle 1400 may form a system such as system 1312 illustrated in FIG. 13. In FIG. 14A, user 1402 is located in vehicle 1400 and is facing forward in vehicle 1400. In FIG. 14B, user 1402 rotates user 1402's head about the Z-axis X°. Inertial measurement device 1306 included in user device 1404 measures angular motion of X°. In the case of FIG. 14B, vehicle 1400 does not rotate, thus processors 1310 of user device 1404 may determine that the relative movement of user device 1404 and user 1402's head is X° relative to the non-fixed reference frame of vehicle 1400. In FIG. 14C, user 1402 rotates user 1402's head about the Z-axis X°. In addition, vehicle 1400 rotates Y° about the Z-axis. Thus, inertial measurement device 1306 included in user device 1404 measures angular motion of X°+Y°. Also, additional inertial measurement device 1308 of vehicle 1400 measures angular motion of vehicle 1400 of Y° about the Z-axis. In order to determine relative motion of user device 1404 and user 1402's head, one or more processors 1310 of user device 1404 may subtract the inertial measurements from additional inertial measurement device 1308 of vehicle 1400 from the inertial measurements from inertial measurement device 1306 of user device 1404. For example, one or more processors 1310 may determine the angular motion of user device 1404 and user 1402's head about the Z-axis is X° by subtracting Y° measured by additional inertial measurement device 1308 of vehicle 1400 from the measured X°+Y° measured by inertial measurement device 1306 of user device 1404.

An inertial measurement device, which in some embodiments may be a commodity inertial measurement unit, may include microelectromechanical gyroscopes and accelerometers (MEMS accelerometers and gyroscopes). The accelerometers and gyroscopes may track acceleration of an object mechanically coupled to the inertial measurement device with 6 degrees of freedom, for example 3 rotational degrees of freedom (angular motion) and 3 translation degrees of freedom (for example, translation in the X, Y, and Z directions). An inertial measurement device may perform measurements in the 6 degrees of freedom at high frequencies, such as frequencies greater than 100 hertz. In some embodiments, an inertial measurement device may perform measurements in the 6 degrees of freedom at frequencies of approximately 1,000 hertz. High frequency measurements and processing of the measurements when used with a user device that includes a head-mounted display may make an image displayed via the head-mounted display appear to be stuck to the head of the user as occurs in the real world. For example, if the user tilts the user's head left to right, the horizon and ground may stay "horizontal" and not appear to be tilted with the user's head. Also, a user may look around by rotating the user's head left to right and the virtual world displayed via the head-mounted display may appear to the user to stay still as the user rotates the user's head.

Figure 15:
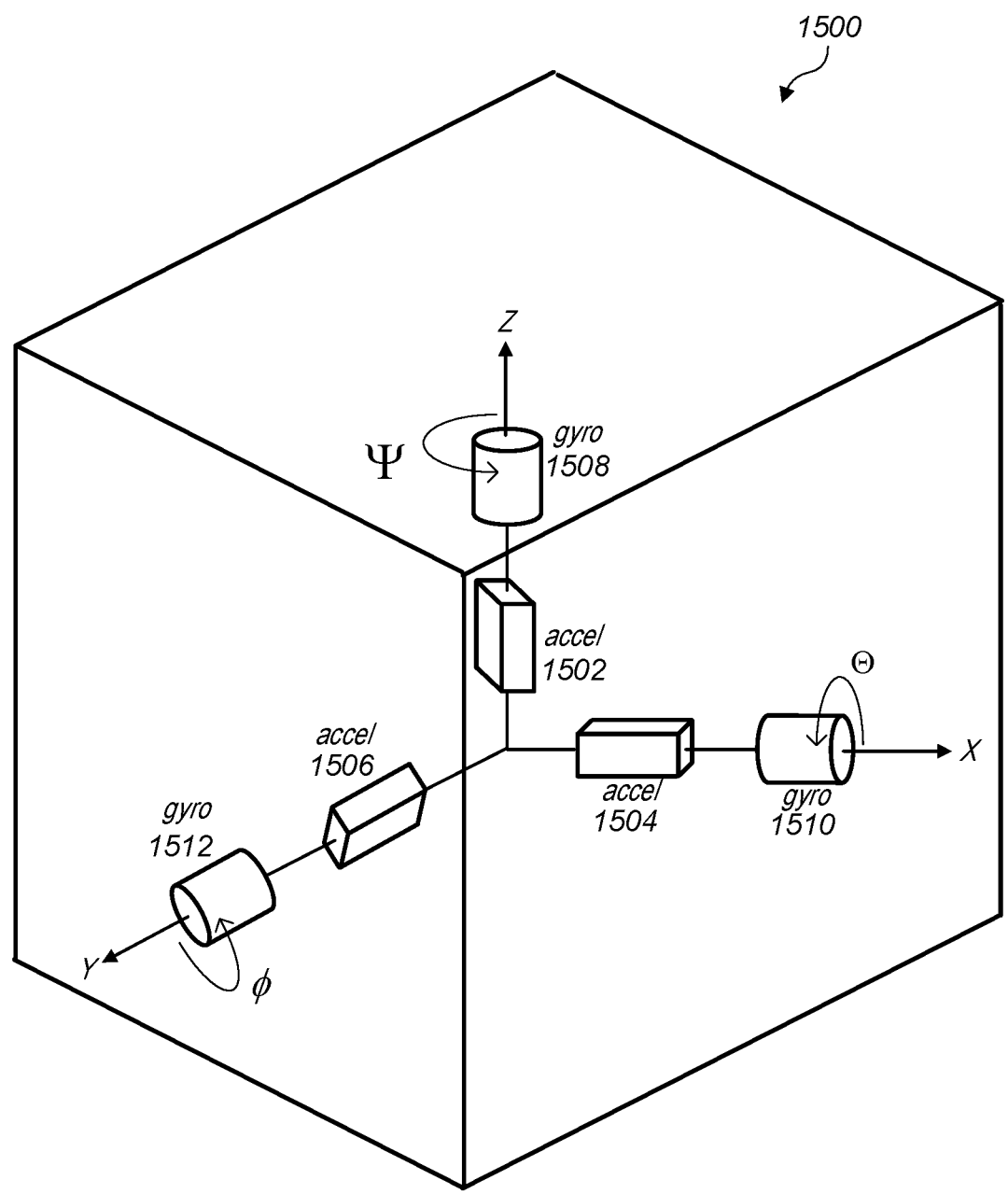
FIG. 15 illustrates a block diagram of an example inertial measurement device, according to some embodiments.

FIG. 15 illustrates a block diagram of an example inertial measurement device, according to some embodiments. Inertial measurement device 1500 includes accelerometer 1502 aligned with a Z-axis and configured to measure acceleration in the Z-direction, accelerometer 1504 aligned with a X-axis and configured to measure acceleration in the X-direction, and accelerometer 1506 aligned with a Y-axis and configured to measure acceleration in the Y-direction. Inertial measurement device 1500 also includes gyroscope 1508 configured to measure angular motion ($\psi$) about the Z-axis, gyroscope 1510 configured to measure angular motion ($\theta$) about the X-axis, and gyroscope 1512 configured to measure angular motion ($\varphi$) about the Y-axis. In some embodiments, an inertial measurement device, such as inertial measurement device 1500 may include additional sensors such as magnetometers, pressure sensors, temperature sensors, etc. The accelerometers and gyroscopes of an inertial measurement device, such as accelerometers 1502, 1504, and 1506, and gyroscopes 1508, 1510, and 1512, may measure both translation motion and angular motion in multiple directions and about multiple axis. Such measurements may be used by one or more processors to determine motion of an object mechanically coupled to an inertial measurement device in three-dimensional space.

Figure 16:
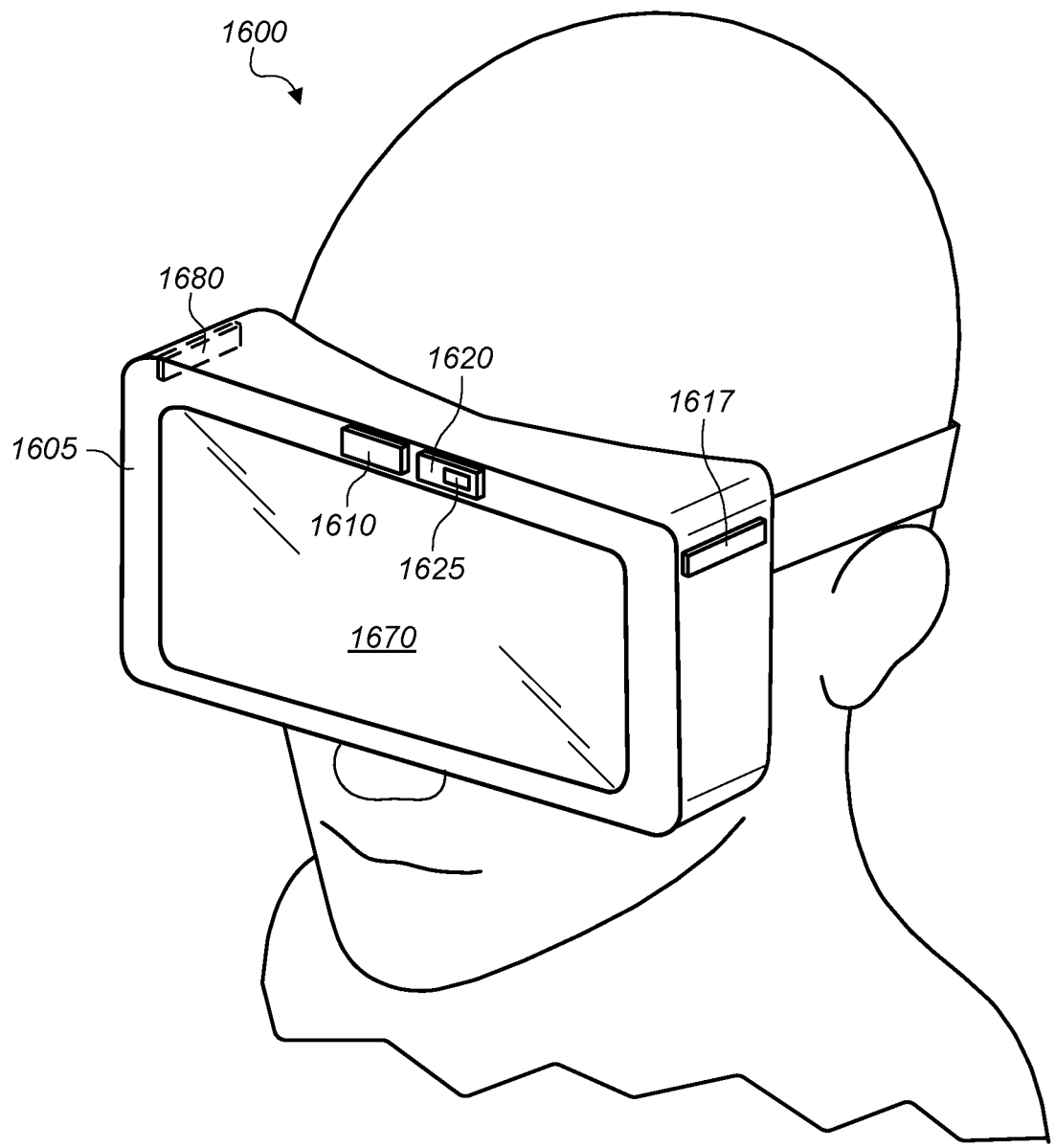
FIG. 16 illustrates an example of a head mounted user device configured to determine relative inertial motion, according to some embodiments.

FIG. 16 illustrates one example embodiment of a head-mounted user device, as described herein. The system illustrated in FIG. 16 represents only one possible embodiment of a user device as described herein and many other configurations are possible, according to various embodiments. As shown in FIG. 16, system 1600 may comprise a frame 1605 configured to hold various element or components of system 1600. For instance, frame 1605 may include one or more displays 1670 via which system 1600 may display (e.g., render) views to the user. Frame 1605 may also hold, enclose, or comprise motion tracking module(s) 1680. Motion tracking module(s) 1680 may be an inertial measurement device, such as inertial measurement device 1500 illustrated in FIG. 15, or inertial measurement devices 108 illustrated in FIG. 1.

In different embodiments, system 1600 may include any of various types of devices including, but not limited to: a personal computer system; a laptop computer; a notebook, tablet, slate, or netbook computer; a handheld computer; a mobile device, such as a mobile phone, tablet device, or music player; a video game console; a handheld video game device; or in general any type of computing or electronic device that includes the functionality of generating images for a virtual reality and/or augmented reality system. In some embodiments, system 1600 and/or processor(s) 1610 may include more or fewer elements than those shown in FIG. 16.

In various embodiments, processor(s) 1610 may be a uniprocessor system including one processor, or a multiprocessor system including several processors (e.g., two, four, eight, or another suitable number). Processor(s) 1610 may include central processing units (CPUs) configured to implement any suitable instruction set architecture, and may be configured to execute instructions defined in that instruction set architecture. For example, in various embodiments processor(s) 1610 may be general-purpose or embedded processors implementing any of a variety of instruction set architectures (ISAs), such as the x86, PowerPC, SPARC, RISC, or MIPS ISAs, or any other suitable ISA. In multiprocessor systems, each of processor(s) 1610 may commonly, but not necessarily, implement the same ISA. Processor(s) 1610 may employ any microarchitecture, including scalar, superscalar, pipelined, superpipelined, out of order, in order, speculative, non-speculative, etc., or combinations thereof. Processor(s) 1610 may include circuitry to implement microcoding techniques. Processor(s) 1610 may include one or more processing cores each configured to execute instructions. Processor(s) 1610 may include one or more levels of caches, which may employ any size and any configuration (set associative, direct mapped, etc.).

In the example system 1600, memory 1620 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAIVIBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 1600 in a chip-on-chip configuration, a package-on-package configuration, or a multi-chip module configuration. In some embodiments, system memory 1620 may store pixel data or other image data or statistics in various formats. Similarly, while the example system 1600 includes, according to one embodiment, persistent storage for non-volatile storage of image data or other data used in the system, in other embodiments, the system may include other types of non-volatile memory (e.g. read-only memory (ROM)) for those purposes. In some embodiments, memory 1620 may include data, such as program instructions 1625.

Processor(s) 1610 may include a graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. The amount of hardware and software implementation may vary from embodiment to embodiment.

I/O devices 1617 may include any desired circuitry, depending on the type of system 1600. For example, in some embodiments, system 1600 may be configured to interface with a separate device comprising an inertial measurement device, such as a mobile computing device (e.g. personal digital assistant (PDA), tablet device, smart phone, etc.), and the I/O devices 1617 may include devices for various types of wireless communication, such as WiFi, Bluetooth, cellular, global positioning system, etc. In some embodiments, I/O devices 1617 may also include additional storage, including RAM storage, solid state storage, or disk storage. In some embodiments, I/O devices 1617 may include user interface devices such as additional display devices, including touch display screens or multi-touch display screens, power buttons, input buttons, control keys, keyboards, keypads, touchpads, scanning devices, voice or optical recognition devices, microphones, speakers, scanners, printing devices, or any other devices suitable for entering or accessing data by, or within, system 1600.

In some embodiments, processor(s) 1610 may include an image signal processor (ISP), which may include dedicated hardware that may facilitate the performance of various stages of an image processing pipeline. In some embodiments, processor(s) 1610 and/or an ISP may be configured to receive image data from an external source and/or from one or more data files stored in memory 1620 and to process the data into a form that is usable by other components of system 1600 (including, but limited to, program instructions 1625, and/or I/O devices 1617). In some embodiments, processor(s) 1610 and/or an ISP may be configured to perform various image procession and manipulation operations including one or more of, but not limited to, image translation operations, horizontal and vertical scaling, non-uniformity correction, filtering, non-uniformity reduction, color space conversion or other non-warping image editing operations, or image stabilization transformations.

Those skilled in the art will appreciate that system 1600 is merely illustrative and is not intended to limit the scope of embodiments. For example, system 1600 may also be connected to other devices that are not illustrated such as an addition device comprising an additional inertial measurement device. In addition, the functionality provided by the illustrated components may in some embodiments be combined in fewer components or distributed in additional components. Similarly, in some embodiments, the functionality of some of the illustrated components may not be provided or additional functionality may be available. In some embodiments program instructions 1625 (e.g., stored in memory 1620) may be executed by processor(s) 1610 to provide various functions of system 1600.

In some embodiments, various functions may be performed by software components executing in memory on another device and communicating with the illustrated system via inter-computer (or inter-device) communication. Some or all of these software components or any data structures described herein may be stored (e.g., as instructions or structured data) in system memory 520, in persistent storage, or may be stored on a non-transitory computer-readable medium or a portable article to be read by an appropriate drive connected to I/O device(s) 1617. In some embodiments, instructions stored on a computer-accessible medium separate from system 1600 may be transmitted to system 1600 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

In some embodiments, processor(s) 1610, memory 1620, and I/O device(s) 1617 may be coupled to a user device as shown in FIG. 16, may be coupled with an inertial measurement device that measures motion of a vehicle, such as inertial measurement device 110, or may be distributed among multiple physical devices within a relative inertial measurement system such as among a user device such as system 1600 and inertial measurement devices such as 110.

Figure 17A:
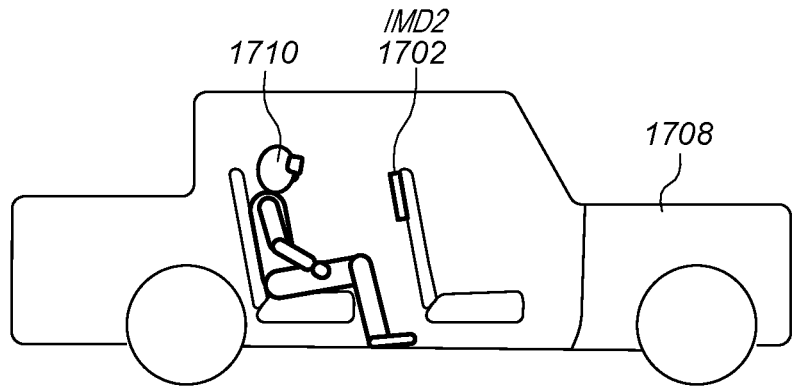
FIGS. 17A-17C illustrate examples of inertial measurement devices configured to measure movement of a reference frame, according to some embodiments.
Figure 17B:
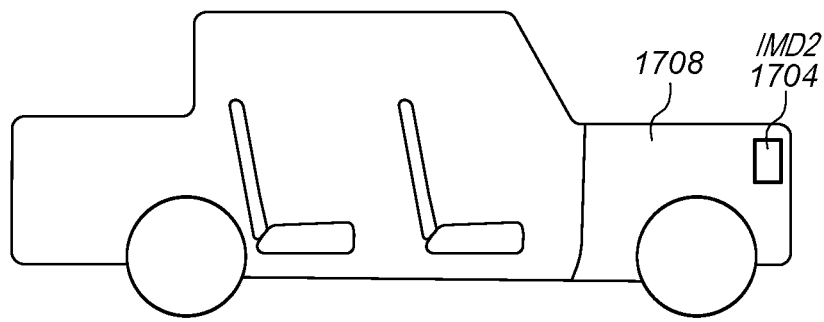
Figure 17C:
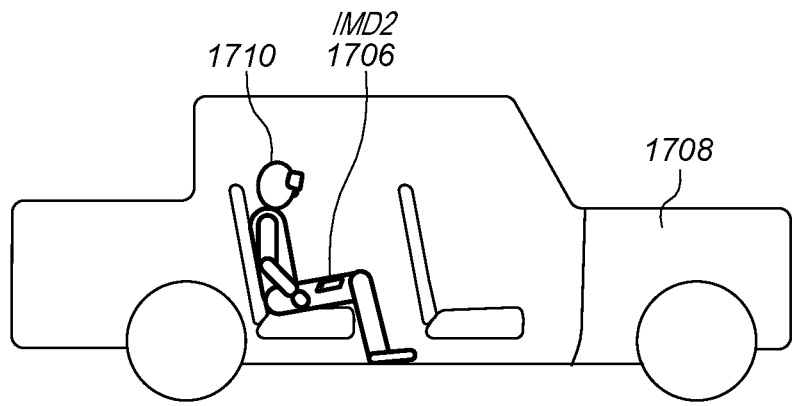

FIGS. 17A-17C illustrate examples of inertial measurement devices configured to measure movement of a vehicle, according to some embodiments. Inertial measurement devices 1702, 1704, and 1706 may be inertial measurement devices such as any of the reference frame inertial measurement devices described herein. For example, inertial measurement devices 110, may be configured similar to inertial measurement devices 1702, 1704, and 1706 illustrated in FIGS. 17A-17C.

In FIG. 17A inertial measurement device 1702 is a separate device configured to couple with a vehicle and move with the vehicle without moving with a user or part of a user's body that is riding in the vehicle. For example, inertial measurement device 1702 may be included in a set purchased by a user 1710 and the user 1710 may mount inertial measurement device 1702 to a vehicle 1708 by strapping the device to the vehicle 1708, using Velcro to couple the device 1702 to a vehicle 1708, using magnets, clamps, or suction cups to couple the device 1702 to a vehicle 1708 or may couple the device 1702 to a vehicle 1708 via other means. In some embodiments, an inertial measurement device, such as inertial measurement device 1704, may be built into a vehicle, such as vehicle 1708. For example an inertial measurement device may part of another vehicle system such as a traction control or stability control system. In some embodiments, a vehicle may include an inertial measurement device, such as inertial measurement device 1704 illustrated in FIG. 17B, that is particularly configured to provide reference inertial measurements to a system such as a head-mounted display system or a controller system. In some embodiments, an inertial measurement device, such as inertial measurement device 1706 illustrated in FIG. 17C, may be included in a device commonly carried by a user. For example, inertial measurement device 1706 may be included in a multi-functional portable electronic device, such as a phone, tablet, laptop, watch, etc. that is commonly carried by a user 1710. The multi-functional portable electronic device may be secured in the user's pocket, in a bag carried, by the user, or via other means such that the multi-functional portable electronic device moves with a vehicle in which the user is riding, but does not move with a part of the user's body to which a user device is coupled that measures the movement of that part of the user's body. For example, a phone in a user's pocket may move with a vehicle in which the user is riding, but may not move with a users' head when the user wears a head-mounted display.

Example Computer System

Figure 18:
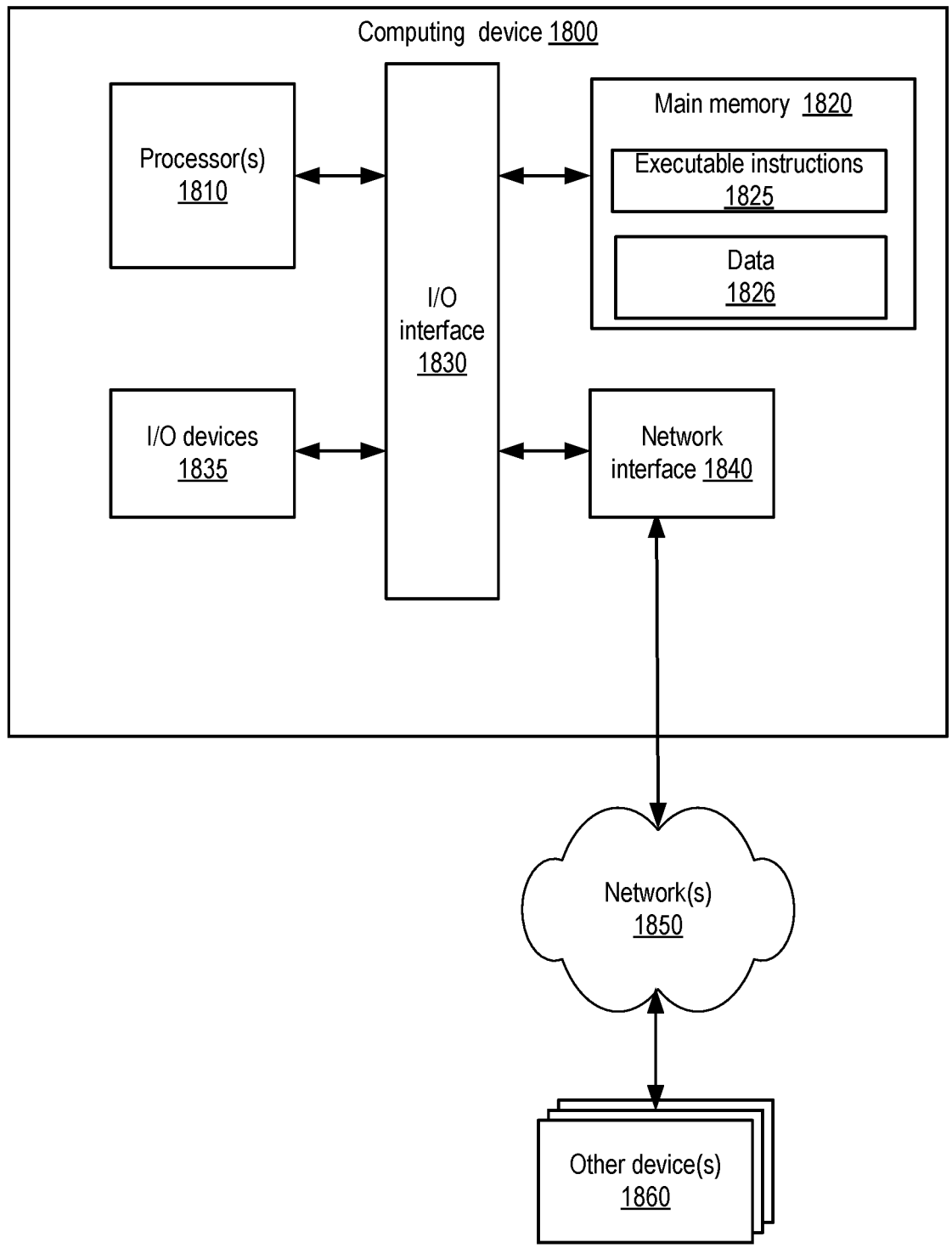
FIG. 18 illustrates an example computer system, that may be included in a user device or inertial measurement system, according to some embodiments.

FIG. 18 illustrates a general-purpose computing device 1800. In the illustrated embodiment, computing device 1800 includes one or more processors 1810 coupled to a main memory 1820 (which may comprise both non-volatile and volatile memory modules, and may also be referred to as system memory) via an input/output (I/O) interface 1830. Computing device 1800 further includes a network interface 1840 coupled to I/O interface 1830, as well as additional I/O devices 1835 which may include sensors of various types.

In various embodiments, computing device 1800 may be a uniprocessor system including one processor 1810, or a multiprocessor system including several processors 1810 (e.g., two, four, eight, or another suitable number). Processors 1810 may be any suitable processors capable of executing instructions. For example, in various embodiments, processors 1810 may be general-purpose or embedded processors implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA. In some implementations, graphics processing units (GPUs) may be used instead of, or in addition to, conventional processors.

Memory 1820 may be configured to store instructions and data accessible by processor(s) 1810. In at least some embodiments, the memory 1820 may comprise both volatile and non-volatile portions; in other embodiments, only volatile memory may be used. In various embodiments, the volatile portion of system memory 1820 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 1825 and data 1826 implementing one or more desired functions, such as those methods, techniques, and data described above, are shown stored within main memory 1820.

In one embodiment, I/O interface 1830 may be configured to coordinate I/O traffic between processor 1810, main memory 1820, and various peripheral devices, including network interface 1840 or other peripheral interfaces such as various types of persistent and/or volatile storage devices, sensor devices, etc. In some embodiments, I/O interface 1830 may perform any necessary protocol, timing or other data transformations to convert data signals from one component (e.g., main memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to memory 1820, may be incorporated directly into processor 1810.

Network interface 1840 may be configured to allow data to be exchanged between computing device 1800 and other devices 1860 attached to a network or networks 1850, such as other computer systems or devices as illustrated in FIG. 1 through FIG. 17, for example. In various embodiments, network interface 1840 may support communication via any suitable wired or wireless general data networks, such as types of Ethernet network, for example. Additionally, network interface 1840 may support communication via telecommunications/telephony networks such as analog voice networks or digital fiber communications networks, via storage area networks such as Fibre Channel SANs, or via any other suitable type of network and/or protocol.

In some embodiments, main memory 1820 may be one embodiment of a computer-accessible medium configured to store program instructions and data as described above for FIG. 1 through FIG. 17 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1800 via I/O interface 1830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1800 as main memory 1820 or another type of memory. Further, a computer-accessible medium may include transmission media or signals such as electrical, electromagnetic, or digital signals, conveyed via a communication medium such as a network and/or a wireless link, such as may be implemented via network interface 1840. Portions or all of multiple computing devices such as that illustrated in FIG. 18 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

What is claimed is:

1. A system comprising:
   a user device comprising an inertial measurement device configured to measure movement of the user device;
   an additional inertial measurement device that moves with a reference frame;
   a camera that moves with the reference frame; and
   a memory storing program instructions that when executed on one or more processors, causes the one or more processors to implement a reference frame motion module, configured to:
      determine, at a first frequency, motion information for the reference frame based, at least in part, on measurements from the additional inertial measurement device;
      adjust, at another frequency, the motion information for the reference frame based, at least in part, on data captured by the camera; and
      provide the motion information for the reference frame to the user device, wherein the user device is configured to determine motion of the user device relative to the reference frame based, at least in part, on the provided motion information for the reference frame.

2. The system of claim 1, further comprising:
   one or more other inertial measurement devices that move with the reference frame, wherein the user device is configured to:
   receive motion information for the reference frame from the additional inertial measurement device;
   receive motion information for the reference frame from the one or more other inertial measurement devices; and
   determine motion of the reference frame based on the motion information for the reference frame received from the additional inertial measurement device and the one or more other inertial measurement devices.

3. The system of claim 1, wherein to adjust the motion information for the reference frame, the reference frame motion module is further configured to:
   identify an object in a view of the camera in two or more camera frames;

determine a velocity or acceleration of the reference frame relative to the object based on respective locations of the object in the two or more camera frames; and wherein said adjust the motion information is adjusted based on a difference between a velocity or an acceleration of the reference frame determined based on measurements from the additional inertial measurement device and the velocity or acceleration of the reference frame determined based on the identified object in the view of the camera.

4. The system of claim 3, wherein the reference frame motion module is further configured to:

determine one or more object types of one or more objects in the view of the camera, wherein at least some of the object types are associated with stationary objects that do not move with the reference frame and other object types are associated with mobile objects that do not move with the reference frame, wherein the reference frame motion module is configured to select the identified object based on determining the identified object has an object type associated with a stationary object that does not move with the reference frame.

5. The system of claim 3, wherein the reference frame is a vehicle, and wherein the camera is coupled to a structure of the vehicle such that a view of the camera is directed toward a scene outside of the vehicle.

6. The system of claim 3, wherein the reference frame is a vehicle, and wherein the camera is positioned such that objects within the vehicle and objects outside of the vehicle are within the view of the camera.

7. The system of claim 1, wherein the user device further comprises:

a camera; and a memory storing program instructions that when executed on one or more processors, causes the one or more processors to implement an additional motion module configured to:

receive the motion information for the reference frame;

determine, at a particular frequency, motion information for the user device relative to the reference frame based, at least in part, on measurements from the inertial measurement device and the received motion information for the reference frame; and adjust, at a different frequency, the motion information for the user device relative to the reference frame based, at least in part, on a difference between motion of the user device determined based on measurements from the inertial measurement device of the user device and motion of the user device determined based on an identified object in a view of the camera of the user device.

8. The system of claim 7, wherein the additional motion module of the user device is further configured to:

distinguish between objects in the view of the camera that move with the reference frame and objects in the view of the camera that do not move with the reference frame, wherein the identified object in the view of the camera in the two or more camera frames is an object that moves with the reference frame.

9. The system of claim 7, wherein the additional motion module of the user device is configured to distinguish between objects in the view of the camera that move with the reference frame and objects in the view of the camera that do not move with the reference frame, based on a velocity or acceleration of the reference frame, wherein the additional motion module of the user device is configured to select the identified object in the view of the camera based on a velocity or acceleration of the object relative to the velocity or acceleration of the reference frame.

10. The system of claim 7, wherein to distinguish between objects in the view of the camera, the additional motion module of the user device is further configured to:

determine one or more object types of one or more objects in the view of the camera, wherein at least some of the object types are associated with objects that do not move with the reference frame and other object types are associated with objects that do move with the reference frame, wherein the additional motion module of the user device is configured to select the identified object in the view of the camera based on the identified object having an object type of an object that moves with the reference frame.

11. The system of claim 1, wherein the user device comprises a phone, tablet, or head mounted display.

12. A reference frame motion measurement system comprising:

an inertial measurement device that moves with a reference frame;

a camera that moves with the reference frame; and a memory storing program instructions that when executed on one or more processors, causes the one or more processors to implement a motion module configured to:

determine, at a first frequency, motion information for the reference frame based, at least in part, on measurements from the inertial measurement device;

adjust, at another frequency, the motion information for the reference frame based, at least in part, on data captured by the camera; and provide the motion information for the reference frame to a user device, wherein the user device determines motion of the user device relative to the reference frame based, at least in part, on the provided motion information.

13. The reference frame motion measurement system of claim 12, wherein the motion module is further configured to:

distinguish between objects in the view of the camera that move with the reference frame and objects in the view of the camera that do not move with the reference frame; and determine motion information for the reference frame based on comparing locations of an object that does not move with the reference frame in two or more camera frames captured by the camera.

14. The reference frame motion measurement system of claim 13, wherein the motion module is further configured to:

determine whether an object in the view of the camera that does not move with the reference frame is a stationary object or a moving object.

15. The reference frame motion measurement system of claim 14, wherein to determine if the object that does not move with the reference frame is a stationary object or a moving object, the motion module is further configured to:

determine a velocity or acceleration of the reference frame based on measurements from the inertial measurement device;

determine a velocity or acceleration of the object based on the two or more camera frames; and compare a velocity or acceleration of the object relative to the reference frame to a velocity or acceleration of the reference frame, wherein if the velocity or acceleration of the object relative to the reference frame differs from the velocity or acceleration of the reference frame by more than a threshold amount, the object is determined to be a moving object.

16. The reference frame motion measurement system of claim 14, wherein to determine if the object that does not move with the reference frame is a stationary object or a moving object, the motion module is further configured to:

determine an object type of the object, wherein at least some object types are associated with stationary objects that do not move with the reference frame and other object types are associated with moving objects.

17. The reference frame motion measurement system of claim 12, wherein the reference frame is a vehicle, and wherein the camera additionally provides information to a vehicle navigation di splay or vehicle information system.

18. A method comprising:

measuring motion of a reference frame at a first frequency based, at least in part, on measurements from an inertial measurement device;

adjusting the motion information for the reference frame at another frequency based, at least in part, on data captured by a camera coupled to a structure that moves with the reference frame; and providing the motion information for the reference frame to a user device, wherein the user device determines motion of the user device relative to the reference frame based, at least in part, on the provided motion information from the reference frame motion measurement device.

19. The method of claim 18, further comprising:

receiving, by the user device, the motion information for the reference frame;

receiving, by the user device, motion information for the reference frame from one or more other inertial measurement devices;

determining motion of the reference frame based, at least part on, averaging or filtering the motion information for the reference frame from the inertial measurement device and from the one or more other inertial measurement devices; and determining motion of the user device relative to the reference frame based, at least in part, on the determined motion of the reference frame.

20. The method of claim 19, further comprising:

determining a weighting factor for motion of the user device determined based on inertial measurements from an inertial measurement device of the user device and the determined motion of the reference frame, wherein the weighting factor corresponds to a robustness of the determined motion based on the inertial measurements;

determining a weighting factor for motion of the user device determined based on an identified object in a view of a camera of the user device in two or more camera frames, wherein the weighting factor corresponds to a robustness of the determined motion based on the camera; and adjusting a reported determined motion of the user device relative to the reference frame based, at least in part, on the weighted determined motion determined based on the inertial measurements and the weighted determined motion determined based on the camera.

* * * * *